US009894701B2

(12) United States Patent
Ang et al.

(10) Patent No.: US 9,894,701 B2
(45) Date of Patent: Feb. 13, 2018

(54) INTER-NODE COORDINATION FOR MANAGING A MODEM PROCESSING PIPELINE

(71) Applicant: QUALCOMM Incorporated, San Diego, CA (US)

(72) Inventors: Peter Pui Lok Ang, San Diego, CA (US); Jing Jiang, San Diego, CA (US); Tingfang Ji, San Diego, CA (US); John Edward Smee, San Diego, CA (US); Joseph Binamira Soriaga, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 15/048,662

(22) Filed: Feb. 19, 2016

(65) Prior Publication Data

US 2016/0330782 A1    Nov. 10, 2016

Related U.S. Application Data

(60) Provisional application No. 62/156,788, filed on May 4, 2015.

(51) Int. Cl.
*H04W 76/02* (2009.01)
*H04B 17/364* (2015.01)
(Continued)

(52) U.S. Cl.
CPC ........ *H04W 76/025* (2013.01); *H04B 17/364* (2015.01); *H04L 47/12* (2013.01);
(Continued)

(58) Field of Classification Search
CPC ........................... H04W 76/025; H04B 17/364
See application file for complete search history.

(56) References Cited

U.S. PATENT DOCUMENTS

2005/0163058 A1* 7/2005 Nabetani ............... H04L 47/10
370/252
2009/0276676 A1* 11/2009 Lee ....................... H04L 1/1812
714/749
(Continued)

FOREIGN PATENT DOCUMENTS

EP          1821441 A1    8/2007
WO    WO-2009134100 A2   11/2009

OTHER PUBLICATIONS

International Search Report and Written Opinion—PCT/US2016/018965—ISA/EPO—dated Apr. 21, 2016.

*Primary Examiner* — Charles C Jiang
*Assistant Examiner* — Thad Defauw
(74) *Attorney, Agent, or Firm* — Qualcomm IP Dept.; James Hunt Yancey, Jr.

(57) ABSTRACT

Various aspects of the disclosure provide for apparatus, methods, and software, for enabling inter-node coordination between scheduling entities and subordinate entities for managing a modem processing pipeline. Pipelining is a proven technique for improving the utilization of hardware processing blocks without substantially increasing chip area. Accordingly, various aspects of the present disclosure provide for efficient processing pipelining at the modem of a wireless communication device, with a general aim to reduce communication latency even in a wide bandwidth network. In various examples, modem processing pipeline efficiency may be augmented by utilizing certain coordination signaling between the sender and the receiver of downlink transmissions, to make the sender aware of the receiver and the pipelining enhancement to be undertaken at the (Continued)

receiver. By virtue of this coordination, the best tradeoff for pipeline efficiency may be targeted, while still meeting a generally tight ACK turnaround requirement.

28 Claims, 17 Drawing Sheets

(51) Int. Cl.
*H04W 28/02* (2009.01)
*H04L 12/815* (2013.01)
*H04L 12/801* (2013.01)
*H04L 12/807* (2013.01)
*H04L 12/841* (2013.01)

(52) U.S. Cl.
CPC .............. *H04L 47/22* (2013.01); *H04L 47/27* (2013.01); *H04L 47/283* (2013.01); *H04W 28/0205* (2013.01); *H04W 28/0215* (2013.01); *H04W 28/0273* (2013.01)

(56) References Cited

U.S. PATENT DOCUMENTS

| | | | | |
|---|---|---|---|---|
| 2013/0109372 A1* | 5/2013 | Ekici | ..................... | H04W 24/02 455/422.1 |
| 2015/0098367 A1* | 4/2015 | Park | ..................... | H04L 1/1861 370/278 |
| 2017/0117992 A1* | 4/2017 | Frederiksen | .......... | H04L 1/1822 |

* cited by examiner

Baseline

Processing Time, plus Guard Period

Example 1

P1/DEC supports CB-level Pipelining

Example 2

Doubled Clock Speed

Example 1

P1/DEC supports CB-level Pipelining

Payload Tapering

Subframe Structure Facilitating Payload Tapering

Example 2

Doubled Clock Speed

Momentarily Increasing Clock Speed

Example 1

P1/DEC supports CB-level Pipelining

Breaking Up into Two Narrower BW Component Carriers

Example 1

P1/DEC supports CB-level Pipelining

Halved Symbol Duration

INTER-NODE COORDINATION FOR MANAGING A MODEM PROCESSING PIPELINE

PRIORITY CLAIM

This application claims priority to and the benefit of provisional patent application No. 62/156,788, titled, "INTER-NODE COORDINATION FOR MANAGING A MODEM PROCESSING PIPELINE," filed in the United States Patent and Trademark Office on May 4, 2015, the entire content of which is incorporated herein by reference as if fully set forth below and for all applicable purposes.

TECHNICAL FIELD

The technology described below relates generally to communication systems, and more particularly, to techniques enabling and providing inter-node coordination for managing a modem processing pipeline. Certain embodiments can be utilized in communication systems and devices to enable extremely wide bandwidth and low latency features along with appropriate hardware having design friendly footprint features and efficient power conservation measures.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. Examples of telecommunication standards include Long Term Evolution (LTE), LTE-Advanced, and LTE-Advanced Pro, which include a set of enhancements to the Universal Mobile Telecommunications System (UMTS) mobile standard promulgated by Third Generation Partnership Project (3GPP). LTE and its variants are designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in multiple access technologies technology. Preferably, these improvements should be applicable to existing and developing multi-access technologies and the telecommunication standards that employ such technologies.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure provide for apparatus, methods, and software, for enabling inter-node coordination between scheduling entities and subordinate entities for managing a modem processing pipeline. Pipelining is a proven technique for improving the utilization of hardware processing blocks without substantially increasing chip area. Accordingly, various aspects of the present disclosure provide for efficient processing pipelining at the modem of a wireless communication device, with a general aim to reduce communication latency even in a wide bandwidth network. In various examples, modem processing pipeline efficiency may be augmented by utilizing certain coordination signaling between the sender and the receiver of downlink transmissions, to make the sender aware of the receiver and the pipelining enhancement to be undertaken at the receiver. By virtue of this coordination, the best tradeoff for pipeline efficiency may be targeted, while still meeting a generally tight ACK turnaround requirement.

In one example, a scheduling entity configured for wireless communication is disclosed. The scheduling entity includes a processor, a memory communicatively coupled to the processor, and a transceiver communicatively coupled to the processor. The processor is configured for utilizing its transceiver to receive a user equipment (UE) capabilities information message including a plurality of ACK latency values, each ACK latency value having a respective associated threshold downlink throughput value; for selecting an ACK latency value from among the plurality of ACK latency values in the UE capabilities information message; and for transmitting a downlink data transmission at a downlink data rate in accordance with the associated threshold downlink throughput value in the UE capabilities information message that is associated with the selected ACK latency value.

In another example, a user equipment (UE) configured for wireless communication is disclosed. The UE includes a processor including a pipeline having a plurality of sequential processing stages, a memory communicatively coupled to the processor, and a transceiver communicatively coupled to the processor. The processor is configured for utilizing its transceiver to transmit a UE capabilities information message comprising a plurality of ACK latency values, each ACK latency value having a respective associated threshold downlink throughput value; for utilizing its transceiver to receive downlink data configured according to the UE capabilities information message; and for processing the received downlink data utilizing the pipeline having the plurality of sequential processing stages.

In still another example, a method of wireless communication operable at a scheduling entity is disclosed. Here, the method includes receiving a user equipment (UE) capabilities information message including a plurality of ACK latency values, each ACK latency value having a respective associated threshold downlink throughput value, selecting an ACK latency value from among the plurality of ACK latency values in the UE capabilities information message, and transmitting downlink data at a downlink data rate in accordance with the associated threshold downlink throughput value in the UE capabilities information message that is associated with the selected ACK latency value.

In yet another example, a method of wireless communication operable at a user equipment (UE) is disclosed. Here, the method includes transmitting a UE capabilities information message including a plurality of ACK latency values, each ACK latency value having a respective associated threshold downlink throughput value, receiving a downlink data transmission configured according to the UE capabilities information message, and processing the received downlink data utilizing the pipeline having the plurality of sequential processing stages.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
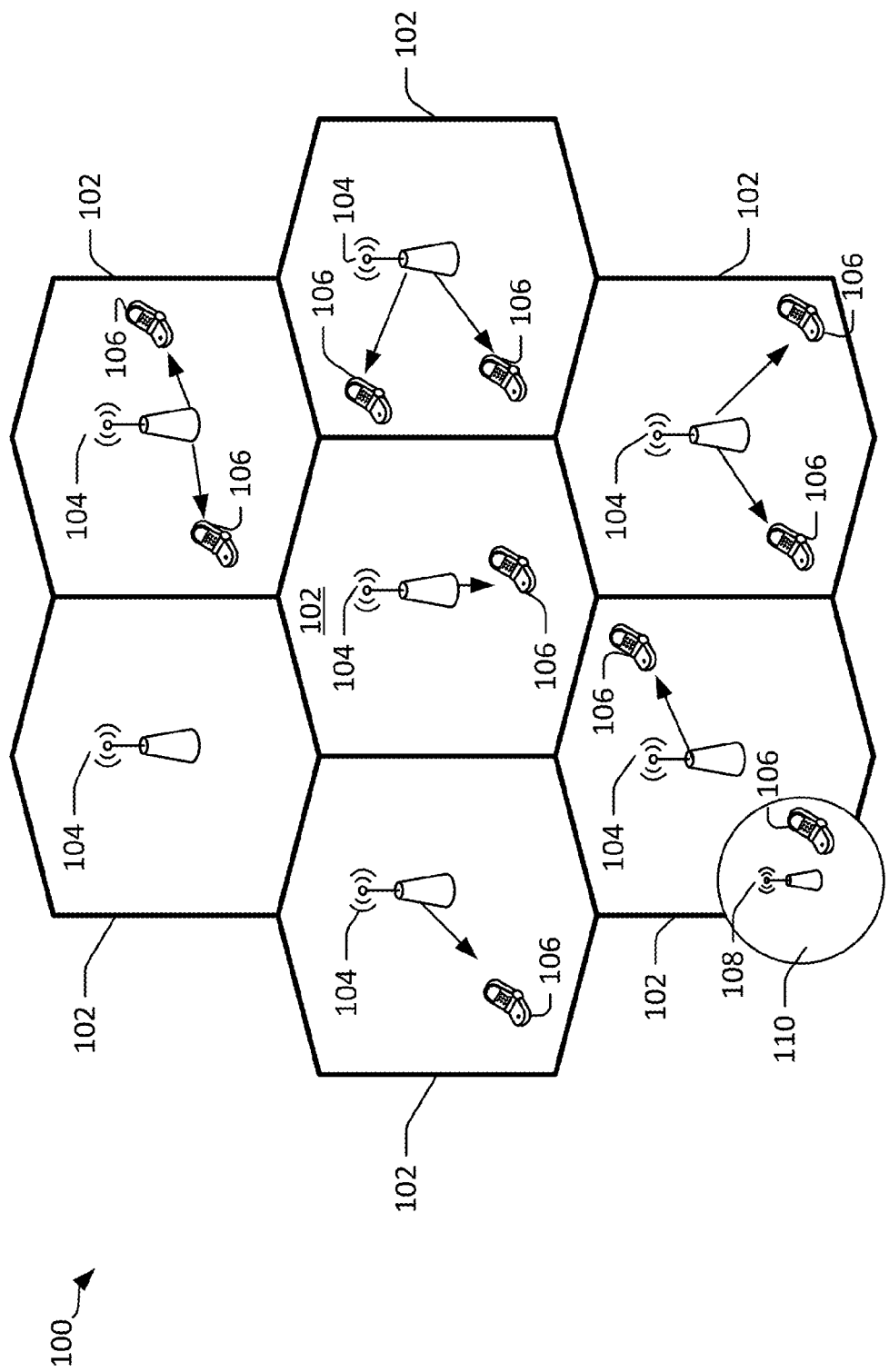
FIG. 1 is a diagram illustrating an example of an access network architecture according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure provide for apparatus, methods, and software for enabling inter-node coordination between scheduling entities and subordinate entities (e.g., between a base station and user equipment) for managing a modem processing pipeline. Pipelining is a technique for improving the utilization of hardware processing blocks without substantially increasing chip area. Some aspects of the present disclosure provide for efficient processing pipelining at the modem of a wireless communication device, with a general aim to reduce communication latency even in a wide bandwidth network.

In various examples, modem processing pipeline efficiency may be augmented by utilizing certain coordination signaling between the sender and the receiver of downlink transmissions, to make the sender aware of the receiver's capabilities and the pipelining algorithm to be undertaken at the receiver. By virtue of this coordination, the best tradeoff for pipeline efficiency may be targeted, while still meeting a generally tight ACK turnaround requirement.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

The various concepts presented throughout this disclosure may be implemented across a broad variety of telecommunication systems, network architectures, and communication standards. For example, the 3GPP defines several wireless communication standards for networks including the evolved packet system (EPS), frequently referred to as long-term evolution (LTE) networks. LTE networks can provide end-to-end latency between a transmitting device and a receiving device on the order of 50 ms, with over-the-air latency for a particular packet being in the range of 10 ms. Currently known LTE functionality provides for a round trip time (RTT) for certain feedback signaling (i.e., hybrid automatic repeat request (HARQ) signaling) of at least about 8 ms, using a transmission time interval (TTI) of 1ms. Here, a TTI may correspond to a minimum duration for a unit of information that can independently be decoded.

Next generation networks going forward, such as a fifth-generation (5G) network, may provide for many different types of services or applications, including but not limited to web browsing, video streaming, VoIP, mission critical applications, multi-hop networks, remote operations with real-time feedback (e.g., tele-surgery or automated driving), etc. In many of these applications, improvements that can reduce latency in the processing and return of feedback transmissions are highly desirable.

FIG. 1 is a diagram illustrating a generalized example of an access network 100, which may be utilized in some embodiments described herein below. In this example, the access network 100 is divided into a number of cellular regions (cells) 102. The macro base stations 104 are each assigned to a respective cell 102 and are configured to provide an access point to a core network for all the UEs 106 in the cells 102. One or more lower power class base stations 108 may have a cellular region 110 that overlaps with one or more of the cells 102. The lower power class base station 108 may be a femto cell (e.g., home Node B), pico cell, micro cell, remote radio head, or in some instances, another UE 106. There is no centralized controller in this example of an access network 100, but a centralized controller may be used in alternative configurations. The base stations 104 are responsible for all radio related functions including radio bearer control, admission control, mobility control, scheduling, security, and connectivity to the serving gateway 116. The UEs 106 in the illustration are shown as mobile phones. However, it is to be understood that mobile phones are merely illustrative of the communicative nature of the UEs 106, and UEs are not limited to mobile phones. Rather, UEs 106 may take any form and have large varieties of functionality, including being stationary or mobile, operating for human communication or for machine communication, etc. Further information about examples of UEs or subordinate entities is provided below, e.g., with reference to FIGS. 2 and 4.

The modulation and multiple access scheme employed by the access network 100 may vary depending on the particular telecommunications standard being deployed. As those skilled in the art will readily appreciate from the detailed description to follow, the various concepts presented herein are well suited for various applications including telecommunication standards employing other modulation and multiple access techniques. By way of example, these concepts may be employed in 5G, LTE, or even Evolution-Data Optimized (EV-DO). EV-DO is an air interface standard promulgated by the 3rd Generation Partnership Project 2 (3GPP2) as part of the CDMA2000 family of standards and employs code division multiple access (CDMA) to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. The actual wireless communication standard and the multiple access technology employed will depend on the specific application and the overall design constraints imposed on the system.

In some examples, the base stations 104 may have multiple antennas supporting MIMO technology. The use of MIMO technology enables the base stations 104 to exploit the spatial domain to support spatial multiplexing, beamforming, and transmit diversity. Spatial multiplexing may be used to transmit different streams of data simultaneously on the same frequency. The data steams may be transmitted to a single UE 106 to increase the data rate or to multiple UEs 106 to increase the overall system capacity. This is achieved by spatially precoding each data stream (i.e., applying a scaling of an amplitude and a phase) and then transmitting each spatially precoded stream through multiple transmit antennas on the downlink (DL). The spatially precoded data streams arrive at the UE(s) 106 with different spatial signatures, which enables each of the UE(s) 106 to recover the one or more data streams destined for that UE 106. On the uplink (UL), each UE 106 may transmit a spatially precoded data stream, which enables the base station 104 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Certain aspects of an access network described herein may relate to a MIMO system supporting OFDM on the DL. OFDM is a spread-spectrum technique that modulates data over a number of subcarriers within an OFDM symbol. The subcarriers are spaced apart at precise frequencies. The spacing provides orthogonality that enables a receiver to recover the data from the subcarriers. In the time domain, a guard interval (e.g., cyclic prefix) may be added to each OFDM symbol to combat inter-OFDM-symbol interference. The UL may use any suitable modulation and coding scheme in various aspects of the disclosure.

Figure 2:
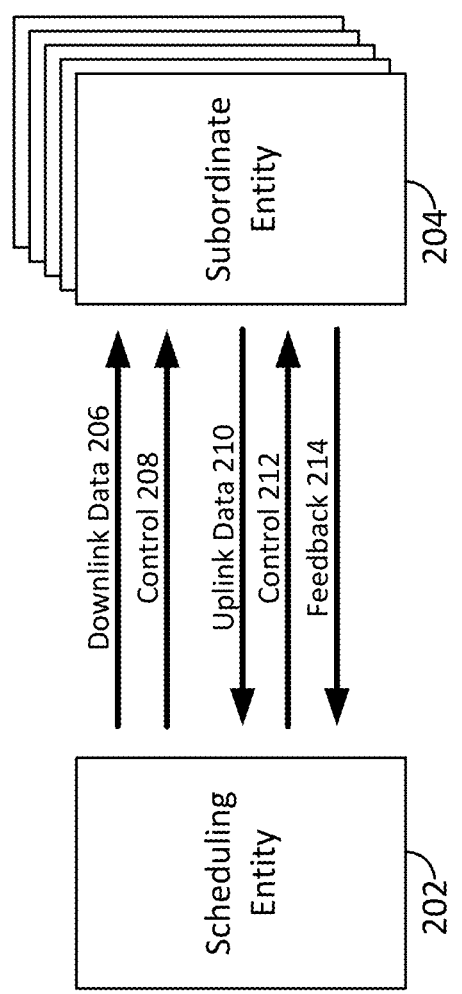
FIG. 2 is a block diagram conceptually illustrating an example of a scheduling entity communicating with one or more subordinate entities according to some embodiments.

In various aspects of the present disclosure, the base stations 104 and 108 described above need not necessarily be utilized at any given time. That is, in a peer-to-peer, device-to-device, or mesh configuration any suitable node including the UE 106 may perform as a scheduling entity, scheduling the use of air interface resources for one or more other devices, acting as subordinate or scheduled entities. Referring now to FIG. 2, a block diagram illustrates a scheduling entity 202 and a plurality of subordinate entities 204. Here, the scheduling entity 202 may correspond to the base stations 104 and 108. In additional examples, the scheduling entity 202 may correspond to the UE 106 or any other suitable node in the wireless communication network 100. Similarly, in various examples, the subordinate entity 204 may correspond to the UE 106, a base station 104/108, or any other suitable node in the wireless communication network 100.

As illustrated in FIG. 2, the scheduling entity 202 may broadcast data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 and/or 212 to one or more subordinate entities 204. Uplink data 210 and/or downlink data 206 may be transmitted using a transmission time interval (TTI). Here, a TTI may correspond to an encapsulated set or packet of information capable of being independently decoded. In various examples, TTIs may correspond to frames, to data blocks, time slots, or other suitable groupings of bits for transmission.

Furthermore, the subordinate entities 204 may transmit a feedback channel 214 to the scheduling entity 202. The feedback channel 214 may in some examples include a scheduling request (SR), i.e., request for the scheduling entity to schedule uplink transmissions. Here, in response to the SR transmitted on the feedback channel 214, the scheduling entity 202 may transmit in the control channel 212 information that may schedule the TTI with uplink packets. In a further example, the feedback channel 214 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other control and feedback channels.

Figure 3:
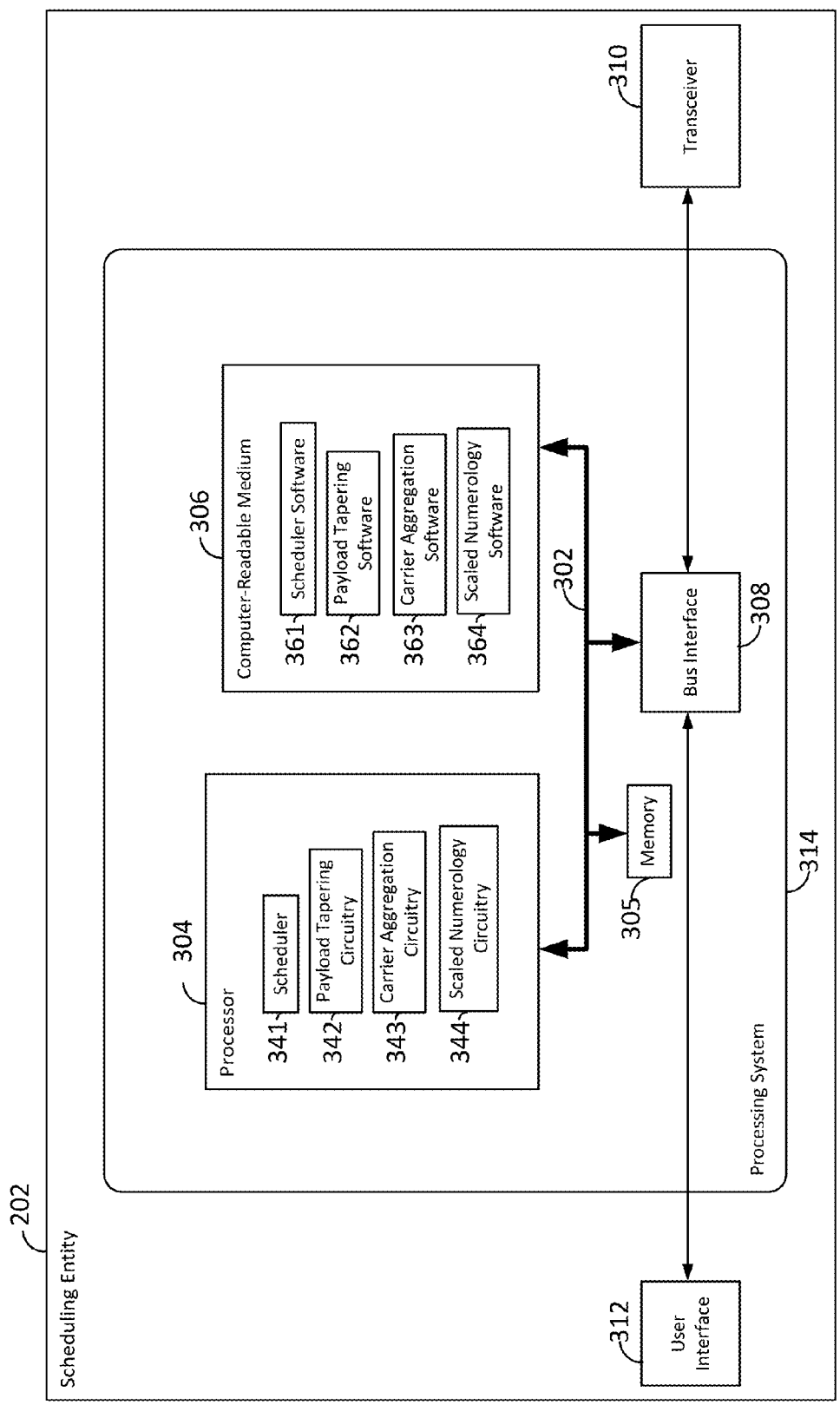
FIG. 3 is a block diagram illustrating an example of a hardware implementation for a scheduling entity employing a processing system according to some embodiments.

FIG. 3 is a conceptual diagram illustrating an example of a hardware implementation for an exemplary scheduling entity 202 employing a processing system 314. In accordance with various aspects of the disclosure, an element, or any portion of an element, or any combination of elements may be implemented with a processing system 314 that includes one or more processors 304.

In various aspects of the disclosure, the scheduling entity 202 may be any suitable radio transceiver apparatus, and in some examples, may be embodied in a base station (BS), a base transceiver station (BTS), a radio base station, a radio transceiver, a transceiver function, a basic service set (BSS), an extended service set (ESS), an access point (AP), a Node B, an eNode B (eNB), mesh node, relay, or some other suitable terminology. A base station may provide wireless access points to a core network for any number of user equipment (UE). Throughout the present disclosure, for ease of reference, the LTE terminology of eNB may be utilized interchangeably with base station or scheduling entity. However, in an actual network, the terminology may change, especially in non-LTE networks, and continue to fall within the scope of this disclosure.

In other examples, the scheduling entity 202 may be embodied in a wireless UE. Examples of a UE include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, an entertainment device, a vehicle component, a wearable computing device (e.g., a smart watch, a health or fitness tracker, etc.), an appliance, a dynamic mobile drone, a fixed/non-fixed small cell device, a gateway, a sensor, a vending machine, an Internet of Things device, an M2M/D2D device, or any other similar functioning device. The UE may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 304, as utilized in a scheduling entity 202, may be used to implement any one or more of the processes described below.

In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include a scheduler or scheduling circuitry 341 configured for scheduling resources for uplink and/or downlink transmission to/from one or more subordinate entities. The scheduler 341 may operate in coordination with scheduler software 361. The processor 304 may further include payload tapering circuitry 342 configured to taper a payload at one or more symbols toward the end of a transmission time interval (TTI). The payload tapering circuitry 342 may operate in coordination with payload tapering software 362. The processor 304 may further include carrier aggregation circuitry 343 configured for configuring a downlink data transmission to be carried over a plurality of component carriers, such that carrier aggregation may be applied at a receiving UE. The carrier aggregation circuitry 343 may operate in coordination with carrier aggregation software 363. The processor 304 may further include scaled numerology circuitry 344 configured for altering a tone spacing and symbol duration for symbols in a downlink data transmission, such that pipelining granularity may be altered at the receiving UE. The scaled numerology circuitry 344 may operate in coordination with scaled numerology software 364.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 4:
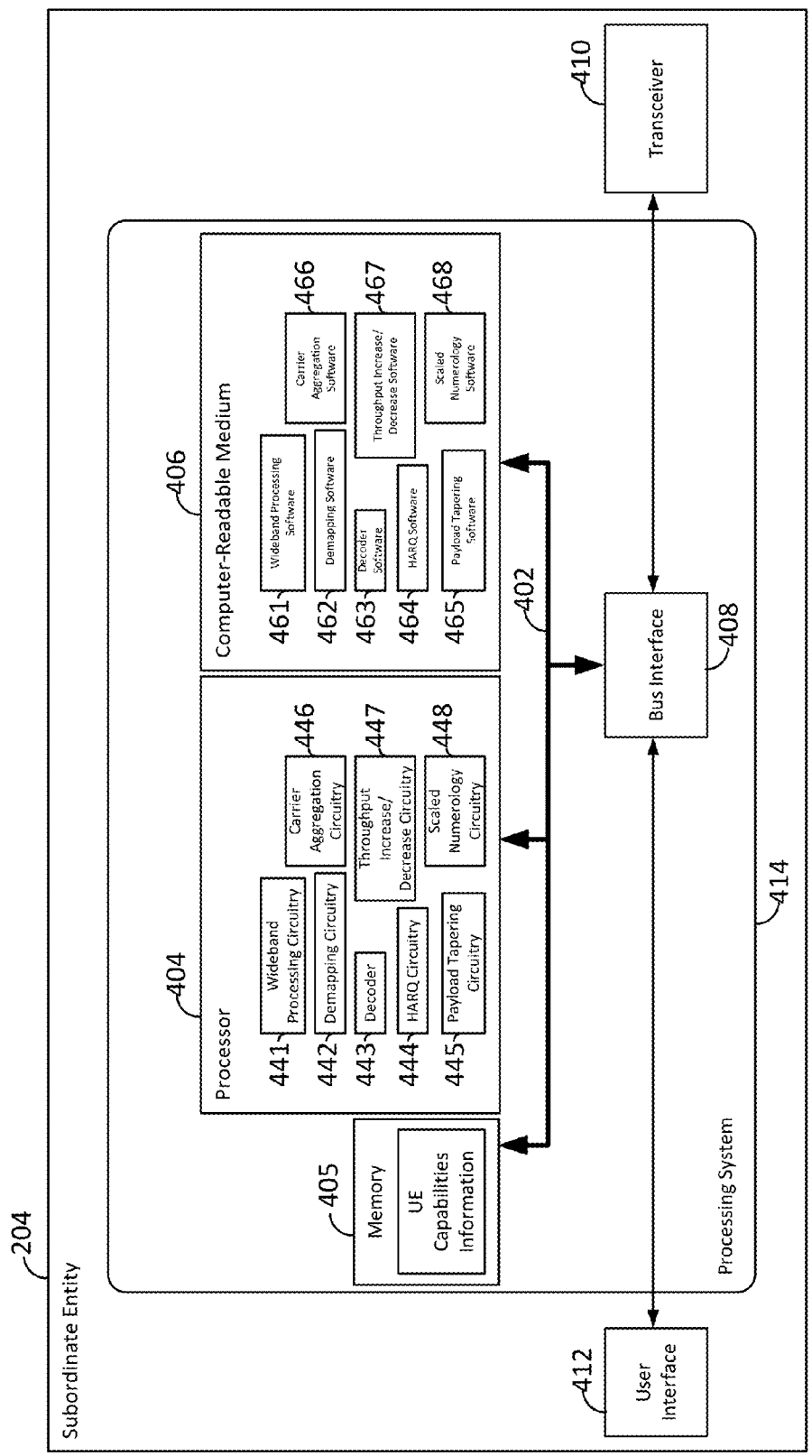
FIG. 4 is a block diagram illustrating an example of a hardware implementation for a subordinate entity employing a processing system according to some embodiments.

FIG. 4 is a conceptual diagram illustrating an example of a hardware implementation for an exemplary subordinate entity 204 employing a processing system 414. In accordance with various aspects of the disclosure, an element, or any portion of an element, or any combination of elements may be implemented with a processing system 414 that includes one or more processors 404.

The processing system 414 may be substantially the same as the processing system 314 illustrated in FIG. 3, including a bus interface 408, a bus 402, memory 405, a processor 404, and a computer-readable medium 406. Furthermore, the subordinate entity 204 may include a user interface 412 and a transceiver 410 substantially similar to those described above in FIG. 3.

In some aspects of the disclosure, the processor 404 may include wideband processing circuitry 441, configured for performing wideband processing such as a fast Fourier transform (FFT) and/or channel estimation. The wideband processing circuitry 441 may operate in coordination with wideband processing software 452. The processor 404 may further include demapping circuitry 442 for performing a demapping operation. The demapping circuitry 442 may operate in coordination with demapping software 462 The processor 404 may further include a decoder or decoding circuitry 443 for performing a data decoding operation. The decoder 443 may operate in coordination with decoding software 463. The processor 404 may further include HARQ circuitry 444 for determining if a data packet, code block (CB), and/or transport block is properly decoded and generating a suitable ACK transmission. The HARQ circuitry 444 may operate in coordination with HARQ software 464. The processor 404 may further include payload tapering circuitry 445 for generating a reduction schedule and managing payload tapering. The payload tapering circuitry 445 may operate in coordination with payload tapering software 465. The processor 404 may further include processing throughput increase/decrease circuitry 447 for momentarily altering a processing throughput for one or more of the processing stages of the pipeline. Here, the processing throughput increase/decrease circuitry 447 may include or be communicatively coupled with one or more clocks utilized by the processor 404 and/or by one or more processing components or processors included in or coupled to the processor 404. In this way, the throughput increase/decrease circuitry 447 may be enabled to momentarily increase or decrease a processing throughput corresponding, for example, to the wideband processing circuitry 441, the demapping circuitry 442, and/or the decoder 443. The processing throughput increase/decrease circuitry 447 may operate in coordination with processing throughput increase/decrease software 467. The processor 404 may further include carrier aggregation circuitry 446 for aggregating a plurality of component carriers. Carrier aggregation circuitry 446 may operate in coordination with carrier aggregation software 466. The processor 404 may further include scaled numerology circuitry 448 for altering a pipeline granularity in accordance with altered tone spacing and symbol duration for symbols in a downlink data transmission. The scaled numerology circuitry 448 may operate in coordination with scaled numerology software 468.

Further, in some aspects of the disclosure, the memory 405 may include a UE capabilities information table for storing information about UE capabilities, desired ACK latency values, peak or threshold downlink throughput values, and support for various pipeline enhancements such as payload tapering, as described further below and illustrated in FIG. 14.

Introduction—5G Network & Communication Features

It is expected that next generation communication systems such as 5G networks may potentially operate with a very wide bandwidth. For example, for the sub-6 GHz band a bandwidth of up to hundreds of MHz may be utilized. These systems are also expected also to support extremely low latency. To achieve the lowest latency, among other things, a device is generally required to achieve a very short turnaround time for acknowledgment (ACK) signaling for HARQ functionality.

Figure 5:
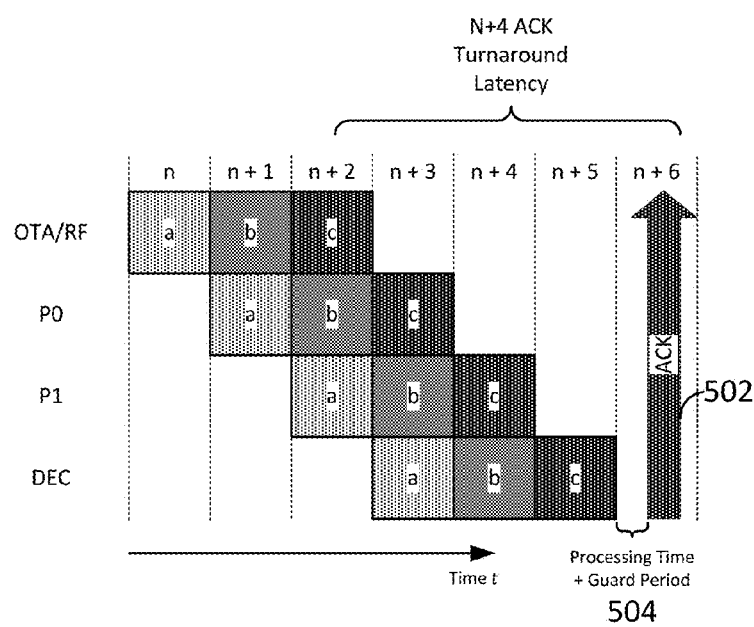
FIG. 5 is a schematic illustration showing a baseline processing pipeline.

FIG. 5 is a schematic timeline showing a processing pipeline wherein a set of three OFDM symbols labeled (a, b, c) are received and processed, and a HARQ ACK is shown being transmitted in response to these symbols. Here, these three OFDM symbols may be a part of a downlink data transmission. In this illustration, time progresses forward from left to right, and time is shown divided into slots labeled n, n+1, n+2, etc. These slots may correspond to the time occupied by a single OFDM symbol. More broadly, the concepts described herein may be utilized according to any time units, not being limited to OFDM symbols. However, for ease of description, in what follows OFDM symbols will be assumed to be the time units. Blocks of the same hatch pattern and label represent operations that belong to the same symbol.

In the illustration of FIG. 5, a baseline case for a receiving and processing pipeline is illustrated. Here, the OTA/RF row represents the over the air (OTA) or radio frequency (RF) stage wherein a series of OFDM symbols are received at a subordinate entity 204 (e.g., utilizing its transceiver 410) as downlink data. Here, it takes the duration of one OFDM symbol (e.g., the slot n) for a sample to arrive. Once the samples have arrived, certain processing may take place. The P(X) rows (P0, P1) represent different hardware processors or processing steps for processing the OFDM symbols. As one example, P0 may represent certain wideband processing such as FFT processing or channel estimation. Referring to FIG. 4, P0 may correspond to operations carried out by wideband processing circuitry 441. Due to the nature of these wideband processing operations, the operations in P0 may in some examples be required to wait until the entire symbol is received in the OTA/RF stage. That is, symbol (a) may not begin at P0 until the complete symbol (a) has been received in the OTA/RF stage. Once this P0 stage is complete, the next stage may take place, labeled as P1. As an example, this stage may represent a demapping operation, known to those skilled in the art. Referring to FIG. 4, P1 may correspond to operations carried out by demapping circuitry 442. Due to the nature of these demapping operations, the operations in P1 may in some examples be required in some examples to wait until the entire wideband processing operation for that symbol is complete. That is, symbol (a) may not begin at P1 until the complete symbol (a) has been processed at the P0 stage. Once the demapping stage P1 is complete, the next stage may take place, labeled as DEC. The DEC row represents a decoding phase where the information represented by the respective OFDM symbols is decoded by a decoder and the original payload bits transmitted by the sender are recovered.

In FIG. 5, only time-critical processing work is illustrated. That is, each stage in the illustration has dependency on its prior stage. Thus, this illustration shows the cadence for each OFDM symbol, being received in one slot, and processing sequentially through the successive processing stages.

In the illustrated example of FIG. 5, for ease of illustration it is assumed that the processing requires two units of work (P0 and P1) by the processor(s), and that the decoder (DEC) requires one unit of work to decode an OFDM symbol, although those of ordinary skill in the art will recognize that this is not necessary to be the case. That is, within the scope of the present disclosure, any suitable number of units of work by the processor(s) and the decoder (DEC) may be needed in a particular implementation.

Finally, an arrow labeled ACK represents the transmission on an uplink of the HARQ-ACK 502 in response to the downlink data. Here, the ACK may include a single bit of information, or in another example, may correspond to the entire transport block contained within a TTI, where the TTI spans multiple symbols and may contain a plurality of code blocks (CB).

Referring still to FIG. 5, it can be seen that this baseline example supports an ACK turnaround latency of n+4. This turnaround latency assumes that there is no delay in processing or sending the ACK. That is, referring to the sample received at the OTA/RF stage at OFDM symbol n+2 (labelled symbol (c)), it may be assumed that this symbol is the last symbol in the TTI. Here, because there are the two processing stages P0 and P1, and the decoding stage DEC, if each of these stages is dependent on completion of its respective prior stage, and all stages occur in sequence, then the ACK may not be transmitted until the time n+6. Because this is a duration of 4 symbols later than the OFDM symbol (c) was received at n+2, the ACK turnaround latency is n+4. In this case, if the latency requirement for the ACK turnaround is n+4 (i.e., an ACK deadline is at slot n+6), this hardware pipelining scheme is considered ideal, as processing is fully pipelined to keep all hardware processing blocks at full utilization.

In such a processing timeline, the lower limit of an ACK turnaround may only be achieved if the receiving device (e.g., the subordinate entity 204) sends the ACK immediately following the end of the processing of the downlink data TTI (i.e., after symbol (c) has completed decoding at the DEC stage). However, in a realistic use case, at least a minimum amount of processing time must to be budgeted following the end of the TTI before an ACK may be transmitted. That is, the receiving device may determine whether the downlink data in the TTI is properly received, e.g., by calculating a cyclic redundancy check (CRC) for the received packet(s). Further, the receiving device may generate the appropriate ACK response message corresponding to the success or failure of the CRC. Furthermore, for time division duplex (TDD) carriers, there may also generally be at least a minimum guard period (GP) for the radio circuitry at the receiving device to switch from the receiving mode, for receiving the downlink data, to a transmitting mode, for transmitting the ACK. This guard period may also be implemented to account for a propagation delay between the receiving device and a central base station. Accordingly, a processing time plus guard period 504 is illustrated in FIG. 5 showing an exemplary (schematic) delay between the completion of the DEC stage and the transmission of the HARQ-ACK.

This combination of very wide bandwidth and very low desired latency in anticipated future networks is expected to pose significant challenges in terms of the hardware implementation for baseband processing. That is, to maintain the processing schedule of large numbers of samples received in each time slot, to meet a desired ACK turnaround latency timeline, the processing efficiency will be a concern. Two general approaches may be considered to address these challenges: parallelization and pipelining.

Broadly, parallelization refers to the inclusion of additional processors or processing resources that might enable the processing stages described above and illustrated in FIG. 5 to be performed in parallel. While parallelization may help to achieve feasibility, it may generally increase the area on a chip, resulting in a higher manufacturing cost for a modem. On the other hand, pipelining is a proven technique for improving the utilization of hardware processing blocks without substantially increasing chip area. Accordingly, various aspects of the present disclosure provide for efficient processing pipelining at the modem of a wireless communication device, with a general aim to reduce communication latency even in a wide bandwidth network.

In many cases, there may be a mismatch between an ideal hardware processing pipeline and a pipeline depth that is dictated by a required ACK turnaround time. In some cases, this mismatch may only occur during a peak downlink throughput scenario. Here, a peak downlink throughput may refer to a peak, or maximum, downlink throughput capability of the UE. For example, if a UE is a category 4 UE (according to LTE standards), then its peak downlink throughput may be 150 Mbps (megabits per second). However, the mismatch may also occur when a UE's modem is operating at below-peak-performance, due to power optimization. That is, suppose that the category 4 UE described above is in a power saving mode. Here, this UE may have a lower 'peak' downlink throughput, e.g., equivalent to a lower class UE such as a category 3 UE. In other examples, a peak downlink throughput may not necessarily refer to maximum capabilities of a device, but may rather refer to a suitable threshold value corresponding to downlink throughput. Here, this threshold may be any suitable downlink throughput value. The threshold may be a single value, may be multiple values (e.g., two or more thresholds), may be a given range of values, may be an index to a downlink throughput value, etc.

Current wireless standards may not generally support flexibility or coordination between devices (e.g., an eNB and a UE) for managing the above mismatch. Similarly, in non-cellular wireless standards such as wireless local area networks (WLAN), such flexibility or coordination between devices may not be supported.

Tradeoffs for Processing Pipeline Enhancements

Figure 6A:
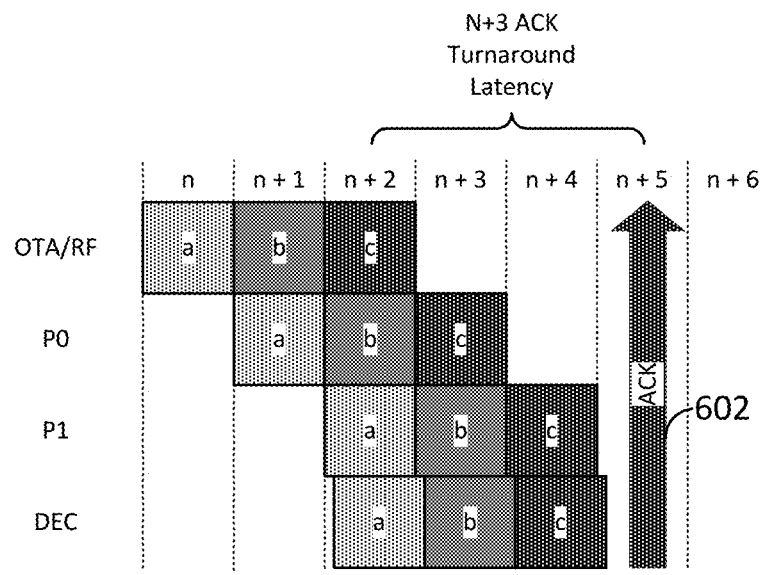
FIGS. 6A-6B are schematic illustrations showing processing pipeline enhancements according to some embodiments.
Figure 6B:
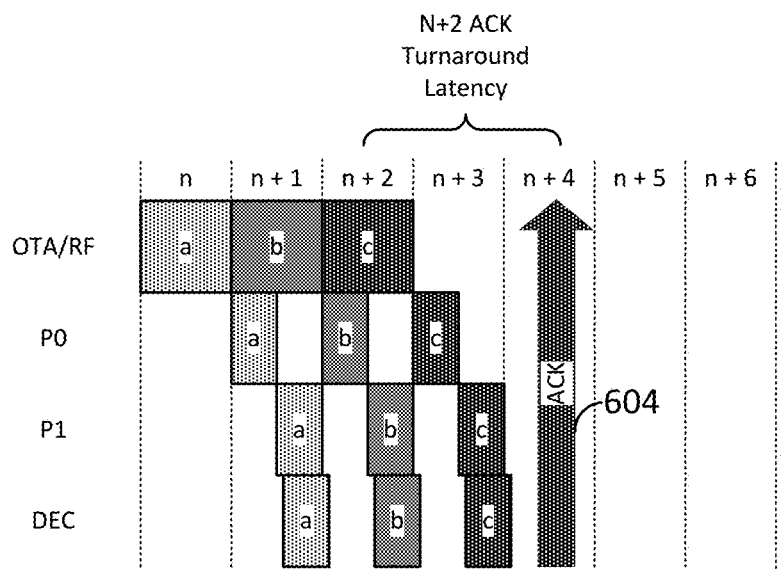

To illustrate some of the tradeoffs that may be faced when modifying a processing pipeline, FIGS. 6A-6B show certain enhancements relative to the baseline pipeline (shown in FIG. 5 and discussed above) for receiving and processing downlink data and transmitting a HARQ-ACK message, and discuss some implications of these enhancements.

FIGS. 6A and 6B illustrate certain enhanced (relative to the baseline shown in FIG. 5) pipeline examples that enable reductions of the ACK turnaround latency to less than n+4. For example, referring now to FIG. 6A, a first enhanced pipeline example is shown. In some scenarios, and as illustrated, a finer granularity of pipeline can be used at the P1 and decoding stage. That is, in this example, the P1/DEC stages support code block (CB)-level pipelining. Here, suppose that the P1 stage runs a de-mapper operation, which can pipeline with the decoder at a relatively fine granularity of the CB-level. Here, the decoder may begin processing the same symbol as soon as the first CB from that symbol becomes available from the output of P1. In this example, assume each symbol contains many CBs, and latency for decoding to start for first CB is negligible (likewise for the last CB). Thus, as can be seen in FIG. 6A, the decoding timeline DEC is only slightly delayed relative to the P1 timeline. In some examples, however, the P1/DEC stages may have to operate a little faster (e.g., by implementing a greater clock speed) to maintain a suitable margin to meet the anticipated ACK deadline for ACK transmission during time n+5. In the illustrated example in FIG. 6A, an ACK turnaround latency of n+3 is achieved, since the ACK 602 may begin to be transmitted during slot n+5.

Referring now to FIG. 6B, a second enhanced pipeline example is shown. In this scenario, a doubled clock speed can be used at all of the processing and decoding stages. That is, if all hardware blocks (e.g., wideband processing circuitry 441, demapping circuitry 442, and decoder 443) are configured to run at double the clock speed relative to the baseline example of FIG. 5, the processing time at each stage may be cut in half. As seen in FIG. 6B, this means that each sequential stage may begin earlier, and the cadence of each OFDM symbol through the processing stages to the decoding stage may be accelerated.

Further, in addition to or in combination with the increased clock speed, as seen in FIG. 6B, the finer granularity (e.g., CB-level granularity) of pipelining at the P1/DEC stages described above and illustrated in FIG. 6A in the first enhanced pipeline may be exploited. Thus, in this example, an ACK turnaround of n+2 may be achieved, since the ACK 604 may begin to be transmitted during slot n+4.

To support the shortest ACK turnaround latency, finer granularity pipelining (e.g., CB-level granularity) may be used. Further, some if not all processing stages PX/DEC may need to turn over at a substantially faster cadence than the symbol time n. Typically, this may be achieved by increasing the clock speed of the processing stages PX/DEC, often trading off energy efficiency and area. Another way to reduce the ACK turnaround latency is by utilizing a greater amount of hardware, and implementing a higher degree of parallelization.

In a given implementation, a combination of above techniques may be used. Generally, however, lower pipeline efficiency may be realized due to lower hardware utilization. That is, there may be extra 'dead time' where hardware blocks may not be used, in addition to an amount of time provisioned as a 'safety' margin. This 'dead time' is most obvious in the second enhanced example described above and illustrated in FIG. 6B, where the clock speed is doubled. Here, it can be seen that some dead time exists at each processing stage PX/DEC between the processing of sequential symbols. Such an existence of dead time can be characterized as resulting in decreased pipeline efficiency.

Some conventional approaches to manage these tradeoffs exist. For example, if the ACK turnaround requirement is allowed not to be very tight, such as having multiple symbol latency, then these dead times need not be created. In another example, existing wireless local area network (WLAN) technologies as defined according to IEEE 802.11b/a/g/n/ac standards utilize a short inter-frame space (SIFS) of 16 µs, and a symbol duration of 4 µs. Here, there exist several multiples of the symbol duration, allowing decent hardware pipelining. Further, IEEE 802.11ax standards utilize certain padding inserted prior to SIFS, such that the hardware may gain extra time for the pipeline to flush out naturally. Still further, 3GPP LTE standards utilize a very relaxed ACK turnaround time requirement, due to a high degree of interlacing (i.e., 8 interlaces for frequency division duplex, FDD).

According to various aspects of the present disclosure, modem processing pipeline efficiency may be augmented by utilizing certain coordination signaling between the sender (e.g., an eNB or other scheduling entity) and the receiver (e.g., a UE or other scheduled or subordinate entity) of downlink data to make the scheduling entity aware of the UE and the pipelining enhancement to be undertaken at the UE. By virtue of this coordination, the best tradeoff for pipeline efficiency may be targeted, while still meeting a generally tight ACK turnaround requirement.

Some aspects of the disclosure provide for payload tapering. Here, a communication device (e.g., an eNB or other scheduling entity) may directly or indirectly reduce the processing load on UE towards the end of the TTI. Some aspects of the disclosure provide for the UE to momentarily increase its processing throughput during a 'crunch' period, to meet the ACK turnaround deadline. Some aspects of the disclosure provide for the use of carrier aggregation if supported by the UE, to achieve better pipeline efficiency. Some aspects of the disclosure provide for the use of a scaled numerology with shorter symbol duration. These and other aspects of the disclosure are described in further detail below.

Payload Tapering

Broadly, tapering refers to reducing an amount of payload information carried by a symbol relative to normal system operation to enable reduced processing at a receiving entity. Payload tapering refers to and can include an algorithm and hardware features capable or enabling an eNB or scheduling entity that is aware of the UE's hardware processing capability, to reduce the processing load inflicted on the UE towards the end of the TTI.

The phrase 'at or near the end of the TTI' generally refers to symbols at or near the last or final OFDM symbol(s) in a TTI. The exact number of symbols that are or can be 'tapered' as discussed below can be suitably selected by the eNB or scheduling entity as desired or according to implementation details. In this way, the UE can meet a relatively short ACK turnaround time. In one example, if the processing pipeline depth is counted backward from the end of the TTI, payload tapering as described below may begin at this symbol. For example, if the processing pipeline depth is equivalent to three symbols, and if the ACK deadline occurs one symbol after the end of the last symbol, then payload tapering should begin on the second-to-last symbol. In some examples, the number of tapered or altered symbols at or near the end of the TTI may be requested by the UE in a reduction schedule signal, discussed in further detail below.

When payload tapering is implemented, in some aspects, the amount of data or information sent may be reduced for the affected symbol(s) at or near the end of the TTI. This may be considered a tradeoff for this feature; however, this tradeoff may be more favorable that some alternatives, such as increasing a gap or guard period between the end of the data and an ACK, or utilizing padding, wherein one or more entire symbol(s) may be unusable. According to some aspects of the disclosure, payload tapering may be achieved by applying any one or more of various suitable techniques to the last symbol, or to multiple symbols at or near the end of a TTI.

Figure 7A:
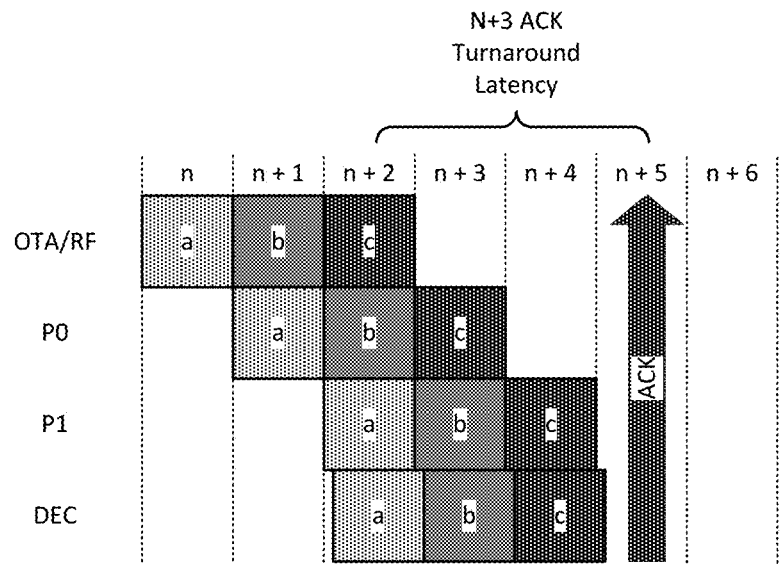
FIGS. 7A-7B are schematic illustrations showing a processing pipeline modified by payload tapering according to some embodiments.
Figure 7B:
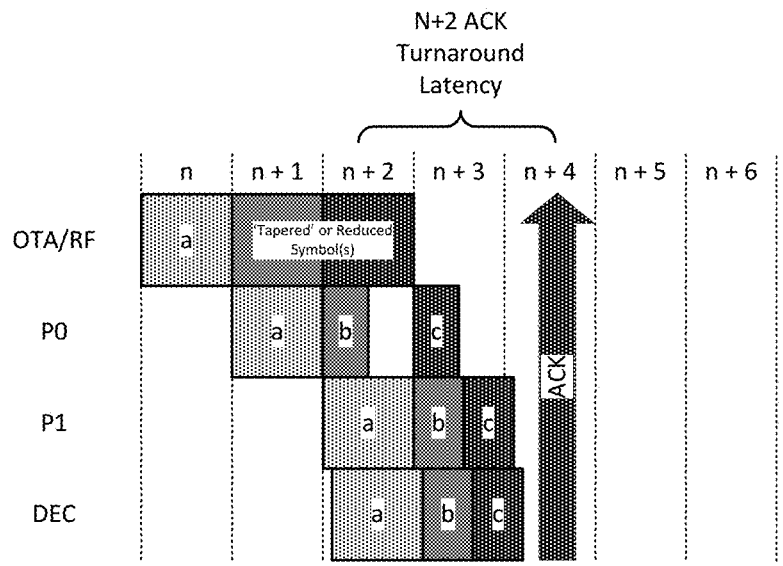

FIG. 7A reproduces the first enhancement, described above and illustrated in FIG. 6A, where a finer (e.g., code block level) granularity of pipeline is used. FIG. 7B is illustrated below for comparison, and illustrates an example utilizing payload tapering in accordance with some aspects of the disclosure. As can be seen in FIG. 7B, the last two symbols (b) and (c), received at the OTA/RF stage at OFDM symbols n+1 and n+2 in the illustration, may be considered 'tapered' or otherwise modified, and may accordingly be processed at one or more of the processing stages P0 and/or P1, and/or may be decoded, in a relatively short time. Because of the short time needed for fully decoding the downlink data, the ACK may be transmitted sooner. This illustration shows an example with an n+2 ACK turnaround latency. Of course, this is merely one example shown to illustrate some concepts.

Figure 8:
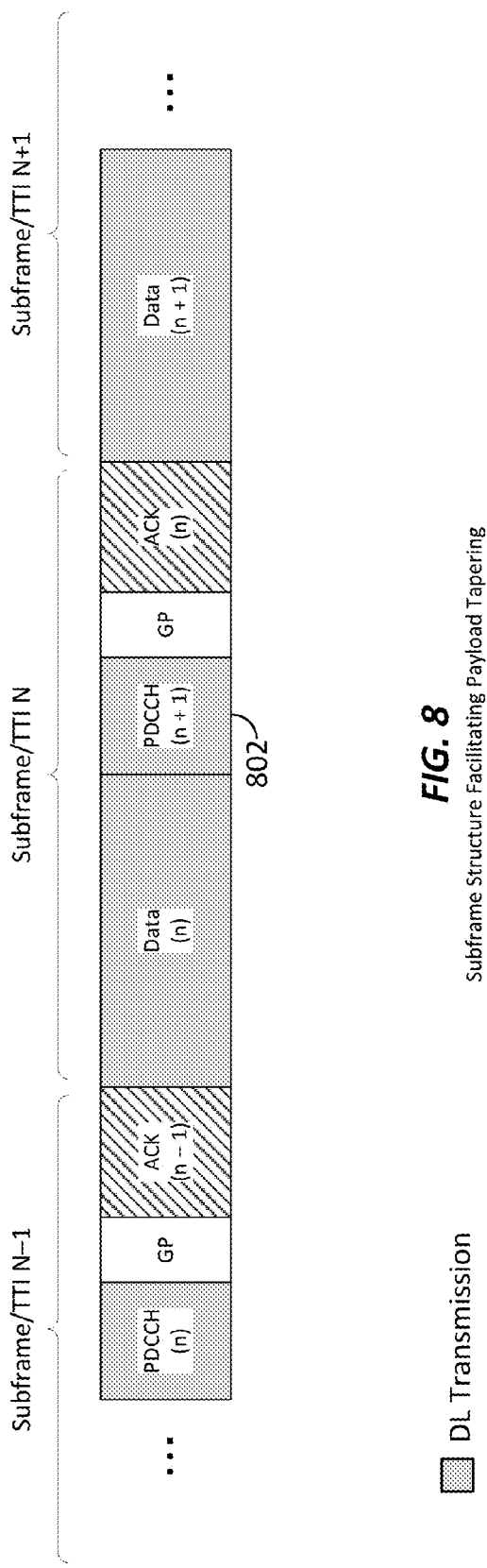
FIG. 8 is a schematic illustration of a time division duplex (TDD) frame structure with interleaved control and data between sequential TTIs according to some embodiments.

For example, payload tapering may be achieved at the scheduling entity 202 by virtue of the frame structure design. Here, the scheduling entity 202 may load one or more symbol(s) at or near the end of the TTI with non-data symbols or demod tones, such as a channel state information reference signal (CSI-RS), a synchronization signal (SYNC), a cell-specific reference signal (CRS), control (where the control may be specific to this user, with pre-scheduling info for the next TTI), etc. However, payload tapering with this TTI or subframe structure design alone may be limited in its effectiveness, since these non-data symbols or demod tones may only constitute a small percentage of tones. (In the present disclosure, transmissions may be structured in frames, which may be divided into subframes, where each subframe occupies one TTI.) In a specific example, illustrated in FIG. 8, a subframe structure may be designed with control and data being interleaved between subframes or TTIs, in which the control region for subframe (n+1) is placed immediately after the data region for subframe (n), and before the UL ACK for subframe (n). By utilizing this interleaved subframe structure, payload tapering may be more effective. That is, by placing non-data symbols (e.g., the PDCCH for the following subframe) in one or more symbols prior to the time for the transmission of the ACK, payload tapering may be facilitated by configuring the control region 802 to load one or more symbols within the control region 802 with suitable bits to ease the processing load of one or more processing stages of a processing timeline at the receiving entity.

In another example, payload tapering may be achieved by virtue of demapper load reduction. For example, if the number of MIMO layers (i.e., the rank) is limited during the last or final symbol(s) toward the end of the TTI, the ACK may be transmitted earlier. That is, the processing complexity typically scales super linearly with increases to the number of layers. Thus, a potential timeline reduction may be very large, even for a relatively small decrease in the number of layers toward the end of the TTI. In another example of demapper load reduction, if the modulation order is limited for downlink transmissions toward the end of the TTI, the ACK may be transmitted earlier.

In still another example, payload tapering may be achieved by virtue of decoder load reduction. Here, the coding rate may be lower during the last or final symbol(s) toward the end of the TTI. For example, fewer CBs and/or faster decoding may be utilized toward the end of the TTI. The faster decoding may in some examples correspond to an early termination operation. That is, early termination is a known algorithm where, if signal conditions are good, the decoder may utilize fewer iterations to recover the original message. Here, an ACK may be transmitted upon completion of the decoding, to notify the transmitting node that it can cease its transmission rather than continuing its transmission of the full encoded packet. One particular example of decoder load reduction may utilize convolutional coding toward the end of the TTI. That is, it can be significantly faster to decode convolutional coded information. This strategy may be most desirable if the same hardware decoder as is used to decode the rest of the TTI can also support convolutional decoding. Otherwise, if a separate decoder is needed, there would be an extra hardware area penalty for this strategy.

In yet another example, payload tapering may be achieved by virtue of padding. That is, at least a portion of the payload may only carry data that is not useful for this UE, i.e., padding.

To achieve payload tapering utilizing any one or more of the above examples, in aspects of the present disclosure, eNB-UE coordination may be utilized. Further information about the details of this coordination signaling, including a reduction schedule, is provided later in this disclosure.

Momentarily Increasing Processing Throughput

In another aspect of the disclosure, ACK turnaround latency may be reduced by momentarily increasing the processing throughput. The processing throughput may generally be increased when the processor is operating in a manner where there is headroom available. That is, if the processor is already operating at its maximum capacity then there would be no headroom for an increase. Thus, if a UE is operating in a certain mode with such processing headroom, and the eNB or scheduling entity is aware of this scenario, then the eNB may accordingly provide downlink data such that UE may increase its clock speed momentarily and in a localized manner, to achieve a tighter ACK turnaround latency.

Figure 9A:
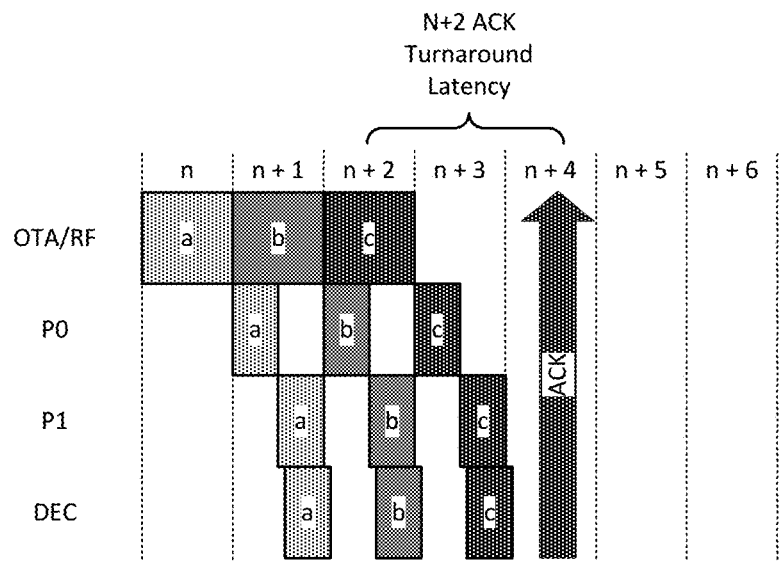
FIGS. 9A-9B are schematic illustrations showing a processing pipeline modified by momentarily increasing a clock speed according to some embodiments.

FIG. 9A reproduces the second enhancement, described above and illustrated in FIG. 6B, where an n+2 ACK turnaround is achieved with a doubled processor clock speed, combined with the finer granularity of pipelining between the P1 and DEC stages. From viewing this illustration, it may be evident that, if the P1 and DEC clock speed can be changed within a TTI, then the processor speed may remain as slow as possible (e.g., 1× speed) until the last symbol. Only at the last symbol might its clock speed be doubled (e.g., 2× speed).

Figure 9B:
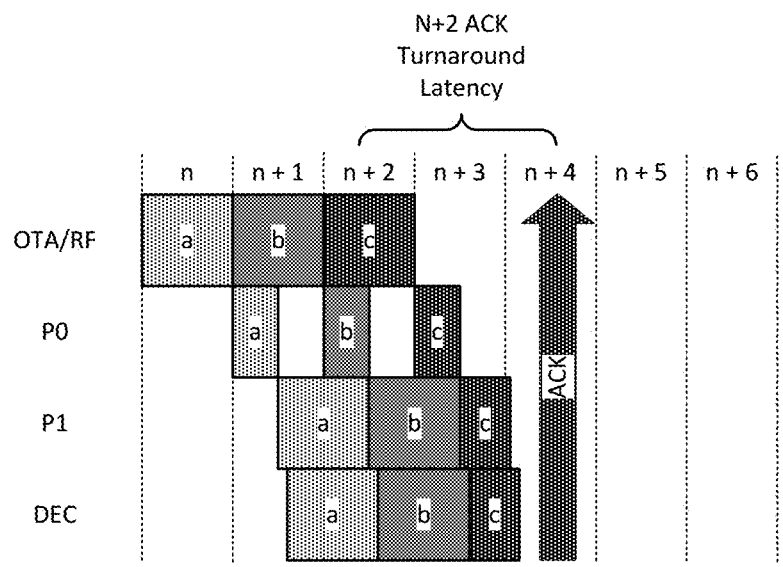

One example of this paradigm is illustrated in FIG. 9B. In this arrangement, a first processor or circuit implementing the P0 phase (e.g., wideband processing circuitry 441) may be clocked at double speed throughout the TTI, while a second processor implementing the P1 phase (e.g., demapping circuitry 442), and the decoder DEC 443, may be clocked at the normal, slower speed (e.g., 1× speed) until they begin processing the last symbol in the TTI (i.e., the symbol (c) received over the air at slot n+2). In this scheme, by achieving the increased processing throughput as delineated, an n+2 ACK turnaround latency may be achieved.

In various aspects of the disclosure, the momentary increases (and decreases) to the processing speed and throughput are not limited to the last or final symbol of the TTI. Further, these momentary increases to the processing speed are not limited to doubling clock speed. That is, any suitable change to the processing speed and throughput may be utilized at any suitable time. The selection of which symbols to apply the momentarily increased processing speed, and how much to speed up, are subject to implementation design considerations.

Further, while the example illustrated in FIG. 9B shows an increased clock speed at the P0 phase, and a momentary increase in the clock speed at the P1 phase, it should be apparent that aspects of the disclosure may be implemented by momentarily increasing the clock speed of any one or more processors or processing stages.

Furthermore, in some examples the processing throughput increase may also be achieved by activating parallelization engines during the 'crunch' period (e.g., at the end of the TTI). This parallelization may add hardware cost, but there may be an energy efficiency advantage to this approach. Thus, some aspects of the present disclosure may achieve a momentary increase in processing throughput not only by increasing the clock speed, but additionally or alternatively by other means of achieving increased processing throughput, including but not limited to activating parallelization engines for achieving parallel processing as needed.

In further aspects of the disclosure, simple coordination signaling between the scheduling entity 202 and the subordinate entity 204 may be utilized to enable these momentary increases to the processor speed or throughput. That is, the eNB or scheduling entity 202 may simply be made aware of processing capabilities that the subordinate entity 204 can support. The UE or subordinate entity 204, e.g., by utilizing the throughput increase/decrease circuitry 447, may autonomously make the decision to increase its own processing throughput for one or more processors or processing stages momentarily and selectively. That is, the subordinate entity 204 may select which hardware blocks to momentarily accelerate.

As a simple example, assume that a UE or subordinate entity 204 can support a peak throughput of X Mbps at Y MHz bandwidth, achieving given ACK turnaround latency. Here, it must be the case that such latency can also be supported at <X Mbps at <Y MHz bandwidth. Here, increases of the processing clock speed may be done to improve the pipeline efficiency for such a case, due to available processing headroom.

Carrier Aggregation

In another aspect of the disclosure, pipeline efficiency may be increased by utilizing carrier aggregation. Here, carrier aggregation may be performed by the UE or other subordinate entity 204 by performing baseband processing across component carriers (CC) serially with the same hardware blocks, as described in further detail below. Broadly, improved pipeline efficiency may be achieved, e.g., in terms of an area or power improvement, while meeting essentially the same throughput and ACK turnaround requirements.

Certain radio access technologies (RATs) use spectrum that is allocated in a carrier aggregation (CA) scheme to obtain a total bandwidth obtained by combining the bandwidth of a plurality of component carriers. The combined bandwidth may be used for transmission in each direction.

Figure 10:
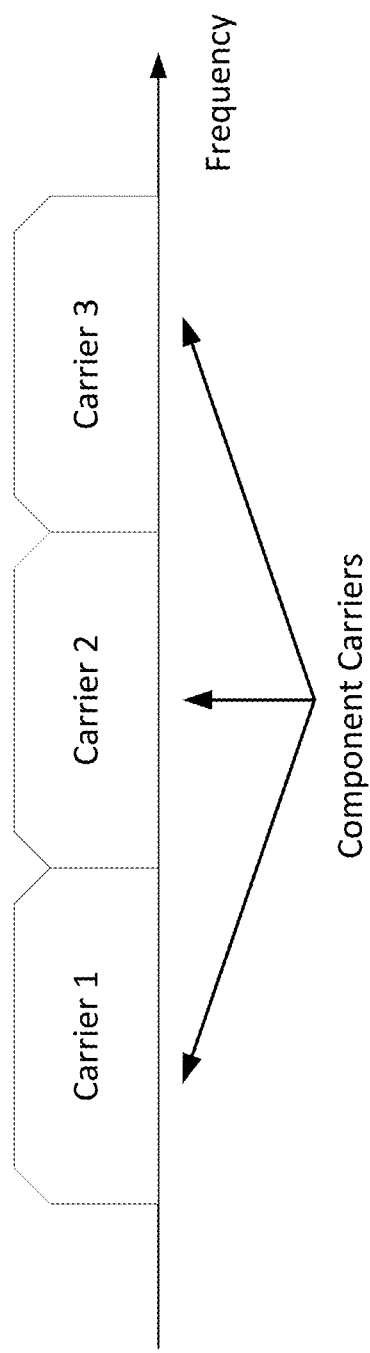
FIG. 10 is a schematic illustration of carrier aggregation utilizing contiguous component carriers according to some embodiments.
Figure 11:
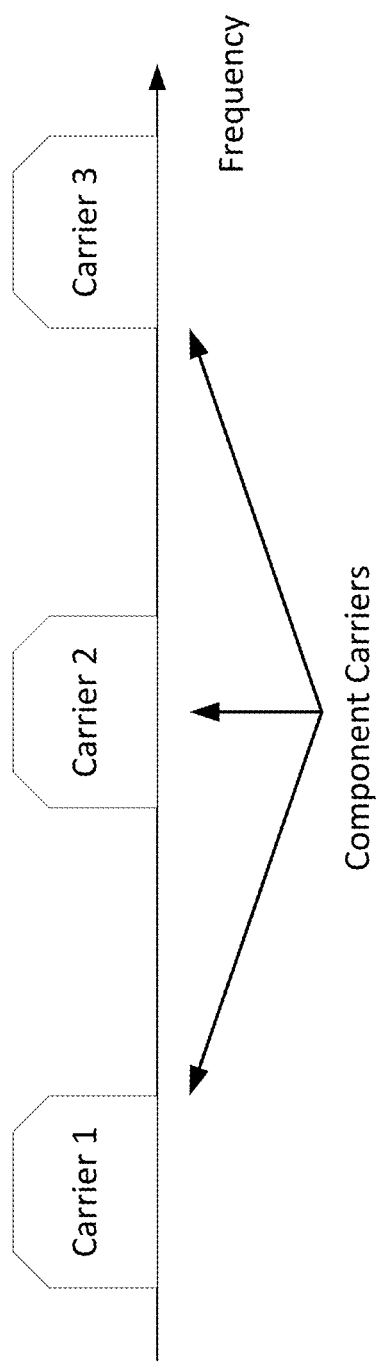
FIG. 11 is a schematic illustration of carrier aggregation utilizing non-contiguous component carriers according to some embodiments.

With reference to FIGS. 10 and 11, different CA schemes may be employed according to various aspects of the disclosure. Possible CA schemes include continuous CA and non-continuous CA. FIG. 10 illustrates an example of continuous CA that employs a plurality of available component carriers that are adjacent to each other. As illustrated in FIG. 11, non-continuous CA may be used when multiple available component carriers are separated within a frequency band. In one example, non-continuous and continuous CA may aggregate multiple component carriers to serve a single device.

A receiving subordinate entity 204 may include carrier aggregation circuitry 446 that may employ multiple RF receiving units and multiple FFTs for non-continuous CA, since the carriers are separated along the frequency band. Because non-continuous CA supports data transmissions over multiple separated carriers across a large frequency range, propagation path loss, Doppler shift and other radio channel characteristics may vary considerably at different frequency bands.

In one example, carrier aggregation circuitry 343 at a scheduling entity 202 may employ a fixed transmitting power on each component carrier, and the effective coverage or supportable modulation and coding of each component carrier may vary. Accordingly, the carrier aggregation circuitry 343 may adaptively adjust the coding, modulation and transmission power for different component carriers to support broadband data transmission under the non-continuous CA approach.

Figure 12:
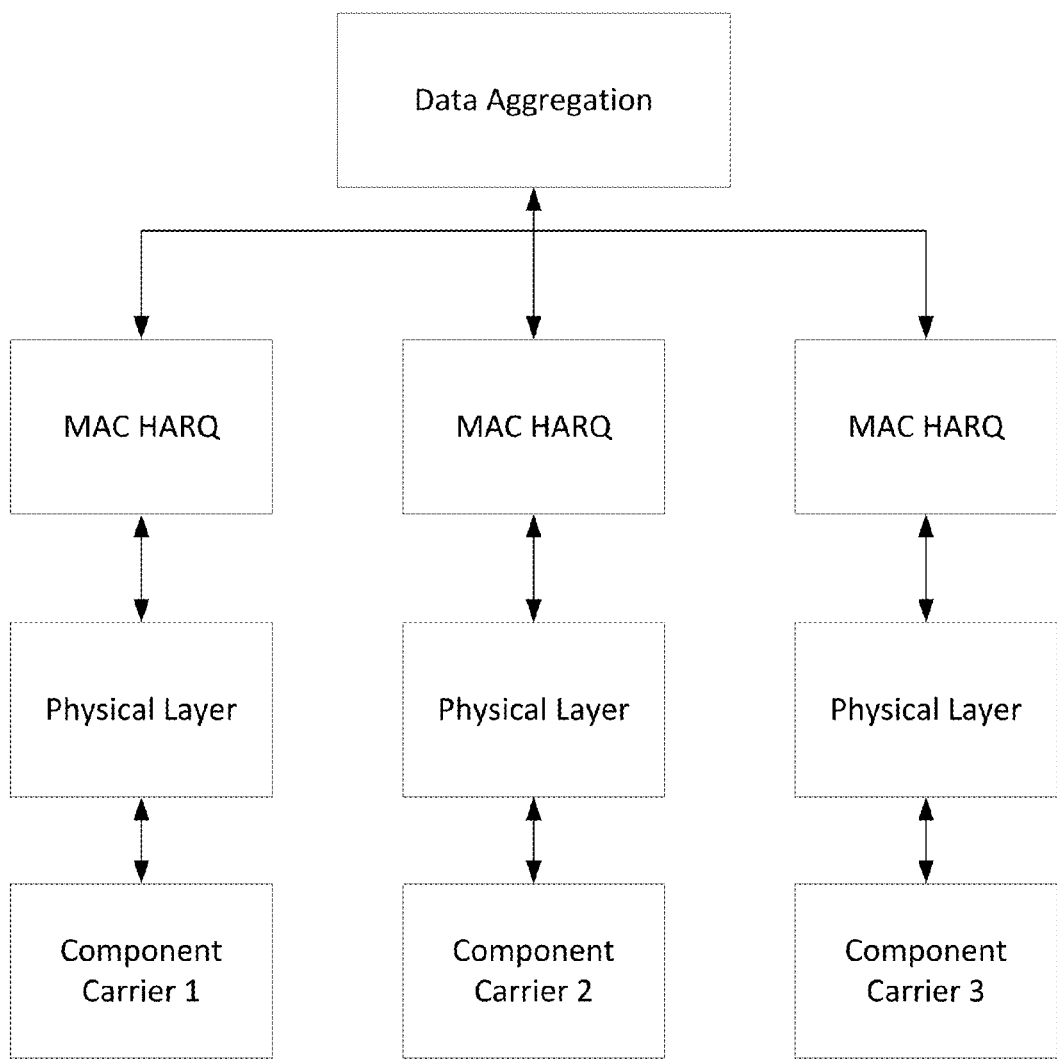
FIG. 12 is a block diagram illustrating the aggregation of transmission blocks from different component carriers at the MAC layer according to some embodiments.

FIG. 12 illustrates the aggregation of transmission blocks (TBs) from different component carriers at the medium access control (MAC) layer according to some aspects of the disclosure. For example, the schematic illustration of FIG. 12 may be implemented by carrier aggregation circuitry 446 within a subordinate entity 204, as described above and illustrated in FIG. 4. With MAC layer data aggregation, each component carrier may have its own independent hybrid automatic repeat request HARQ entity, or the equivalent thereof, in the MAC layer and its own transmission configuration parameters (e.g., transmitting power, modulation and coding schemes, and multiple antenna configurations) in the physical layer. Similarly, in the physical layer, one HARQ entity may be provided for each component carrier.

In various aspects of the disclosure, control info for a secondary component carrier (CC) may be carried on a primary CC. That is, CCs may not be self-contained in some examples. Further, for TDD carriers, CC scheduling may be coordinated in terms of their direction (i.e., UL or DL). This can facilitate the pipelining option discussed as follows, as from the control perspective, the multiple CCs could be viewed as more tightly coupled together, and the final ACK could be bundled together.

Figure 13A:
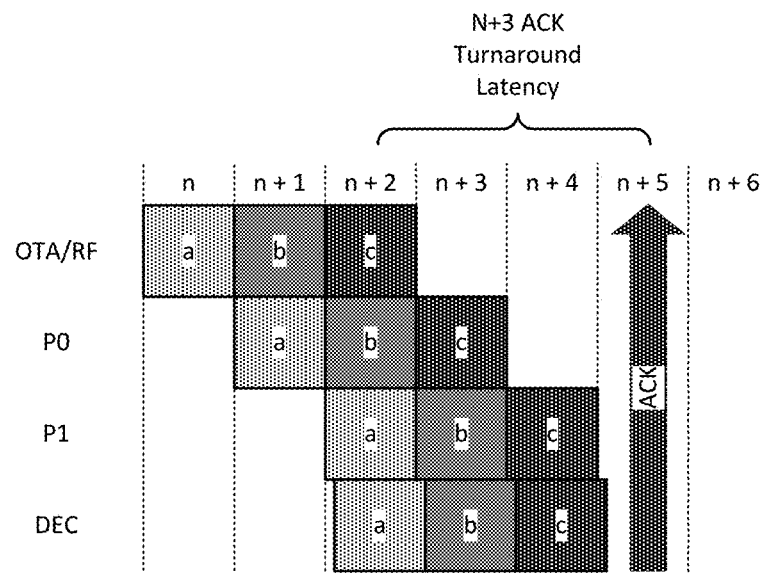
FIGS. 13A-13B are schematic illustrations showing a processing pipeline modified by implementing carrier aggregation according to some embodiments.
Figure 13B:
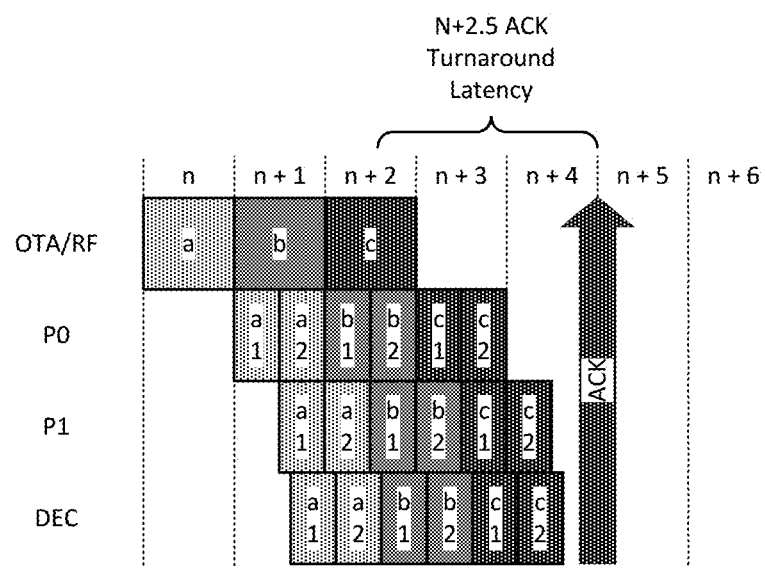

Referring now to FIGS. 13A and 13B, as indicated above, the first processor stage indicated as P0 may correspond to certain wideband processing, such as an FFT. When performing an FFT at the first processor stage P0, the second processor stage P1 cannot begin its processing until the entire FFT procedure is completed. Thus, the processing stage subsequent to a stage that performs the FFT must generally wait to begin until its previous processing stage is fully complete.

For smaller CC bandwidths, the processing time for an FFT is typically reduced relative to that for wideband CCs. Thus, if smaller CC bandwidths are utilized, then the processing stage subsequent to the processing stage that includes the FFT may begin processing earlier on the symbol. This can effectively reduce the pipeline granularity for the wideband processing stage P0, and for the subsequent stage P1 in the illustrated examples. Accordingly, in an aspect of the present disclosure, ACK turnaround latency can be improved by reducing CC bandwidth.

FIG. 13A reproduces the first enhancement, described above and illustrated in FIG. 6A, where a finer granularity of pipeline is used at the P1-DEC stage. FIG. 13B is illustrated below for comparison, and illustrates an example utilizing narrower CC bandwidths for increasing pipeline efficiency in accordance with an aspect of the present disclosure. In this example, the CC bandwidth is divided in half relative to the CC bandwidth in the example of FIG. 13A. That is, each symbol (a, b, c) is illustrated with two components 1 and 2, representing the portion of that symbol on respective CCs. As illustrated, for the samples of the OFDM signal received at time n (labeled a), the first processing stage P0, which in this example includes wideband processing such as an FFT, begins after the OTA/RF stage is completed. Here, rather than needing to wait until the FFT is complete for the entire symbol (a) received at time n, the second processing stage P1 can begin at an earlier time, as soon as the wideband processing at stage P0 is complete on the first component of this symbol, labeled 1 (e.g., a1). That is, due to the narrower bandwidth of the CCs, the FFT and/or other wideband processing on the component a1 may be completed earlier. In this way, this example may provide for acceleration of the ACK turnaround latency by 0.5 symbols relative to the example in FIG. 13A.

While this illustrated example shows a finer granularity by utilizing half-bandwidth CCs, it should be observed that within the scope of the present disclosure, any number of CCs may be utilized, such as three CCs at ⅓ of the bandwidth each, etc. Furthermore, the bandwidth of each of the CCs need not necessarily be the inverse of the number of CCs. For example, if two CCs are utilized, it is not necessary that each CC have ½ the bandwidth of other symbols. Any suitable reduction in the bandwidth in a given CC may result in a corresponding reduction in the processing time for the information carried on that CC.

Furthermore, note that in FIGS. 13A and 13B, the finer granularity with CB-level pipelining is also utilized, so that the decoding stage DEC may begin shortly after the second processing stage P1 begins, without needing to wait until the second processing stage P1 is fully complete.

In some aspects of the disclosure, to facilitate fast processing, the CCs may be tightly coupled, with control information carried on a first component carrier.

In practice, several overhead factors may reduce the net gain of the carrier aggregation algorithm described above. For example, overhead associated with a guard band in between CCs may reduce the net gain. Further, processing and management overhead associated with context switching from one CC to another CC may reduce the net gain. Still further, some implementations of hardware architecture may not be designed to support better hardware pipelining with carrier aggregation. For example, in an architecture where each stage loops through all CCs before the next stage can start, then it would not be possible to pull in the processing timeline.

Scaled Numerology

In another aspect of the disclosure, ACK turnaround latency may be reduced by using a harmonized numerology. That is, different tone spacings and symbol durations can co-exist within a single OFDM waveform, and strategic use of this numerology can result in reduced ACK turnaround latency.

As indicated above, in a processing pipeline all time domain samples within the OFDM symbol are generally collected before an FFT or other processing activity may be performed. When dealing with very wide bandwidths, the collection of the samples within the OFDM symbol may take a relatively long time. However, if a smaller time symbol duration were used, e.g., by doubling the tone spacing, and accordingly scaling down the symbol duration in time, then the pipelining granularity may be effectively reduced.

Figure 14A:
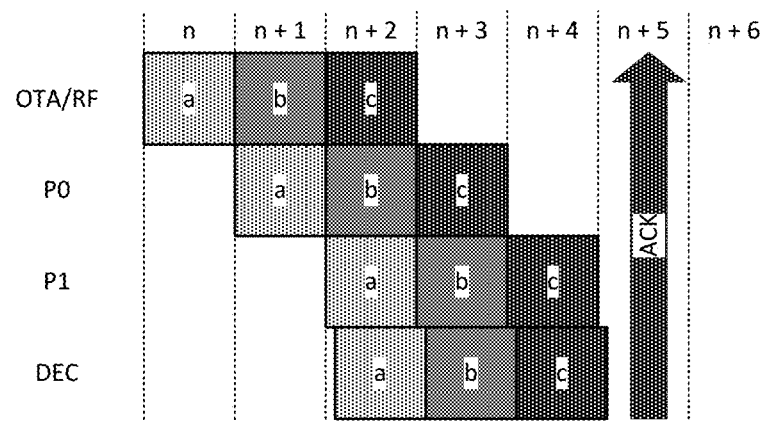
FIGS. 14A-14B are schematic illustrations showing a processing pipeline modified by implementing a scaled numerology according to some embodiments.
Figure 14B:
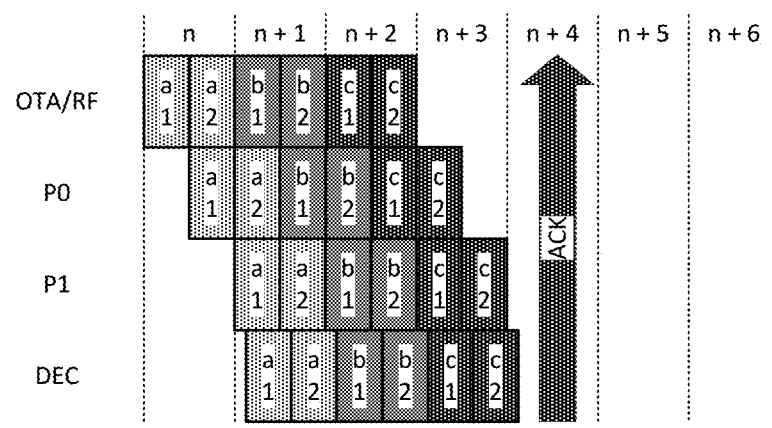

FIG. 14A reproduces the first enhancement, described above and illustrated in FIG. 6A, where a finer granularity of pipeline is used at the P1-DEC stage. In this illustration, it may be assumed that a suitable symbol duration and tone spacing are utilized. FIG. 14B is illustrated below, for comparison, and illustrates and example utilizing a scaled numerology for reducing the ACK turnaround latency in accordance with an aspect of the present disclosure. In this example, the tone spacing may be doubled (or scaled up by some other suitable value), such that the symbol duration is accordingly shortened and pipelining granularity is reduced, as described above. In the illustration of FIG. 14B, the numbers 1 and 2 represent the symbols that originally belong to the same symbol in FIG. 14A. Here, by effectively reducing the granularity, each sequential processing stage can begin sooner, reducing the ACK turnaround latency to essentially an n+2 turnaround.

In practice, several overhead factors may reduce the net gain of the scaled numerology algorithm described above. For example, the hardware processing throughput may not scale linearly or optimally with the reduced number of tones per shortened symbol, due to overhead associated with each symbol. For example, a half-sized FFT may still take more than half of the cycles to execute. Further, a cyclic prefix (CP) may be cut short in order to fit within harmonized numerology, potentially sacrificing performance. Moreover, the scaled numerology algorithm may be difficult to implement in practice, because the eNB or scheduling entity 202 may switch to a new numerology to help the pipelining of a particular UE or subordinate entity 204, which may be difficult or not possible in some use cases. However, adoption of the scaled numerology algorithm may in some examples be adopted in strategic positions in the timeline for certain specialized tones that may benefit from the reduced ACK turnaround latency, such as certain critical processing, e.g., pilot tones.

eNB-UE Coordination Signaling

According to a further aspect of the present disclosure, basic and enhanced coordination between a scheduling entity 202 and subordinate entities 204 may be provided for managing modem processing pipeline efficiency. That is, signaling may be transmitted from the UE (or other suitable scheduled or subordinate entity 204) to the eNB (or other suitable scheduling entity 202) for indicating UE capabilities relating to pipeline efficiency selections. Furthermore, the eNB may utilize this UE capabilities signaling to determine various aspects of downlink data transmissions to that UE.

In various aspects of the disclosure, during an initial registration procedure, the eNB or scheduling entity 202 may receive from the UE or subordinate entity 204 a message that indicates UE capabilities. This UE capabilities message may further include a description of certain processing capabilities of the UE. For example, in some examples, a UE capabilities message may include an indication of the minimum ACK turnaround that can be supported by the UE, and the associated threshold (e.g., peak) throughput for the UE. Generally, for a longer ACK turnaround latency, a UE may be able to support a higher peak throughput. Accordingly, the UE capabilities message may provide this relationship. For example, one entry may indicate that, for an ACK turnaround latency of n+2, a given threshold downlink throughput (e.g., in bits per second) may be supported. However, for a slower ACK turnaround latency of n+3, a different (e.g., higher) peak downlink throughput may be supported. In some aspects of the disclosure, a typical UE may support an n+2 and an n+3 ACK latency. Here, the n+3 ACK latency results in a 2-symbol gap for the data-ACK. Of course, it is to be understood that a particular implementation of a subordinate entity may support any number of ACK latencies, having a variety of different values.

In some examples, rather than providing a threshold downlink throughput in bits per second, the threshold downlink throughput signaled to the scheduling entity 202 may be defined in a fashion similar to the way UE categories are defined in existing LTE standards. For example, a threshold (e.g., peak) downlink throughput may be signaled as a maximum total bits per TTI, or a maximum number of bits per transport block.

For example, assume the transceiver 410 at the subordinate entity 204 can support a bandwidth of 100 MHz for a single carrier. In this case, to achieve an ACK latency of n+2, the subordinate entity 204 can have a peak downlink throughput of X bits per second, and for ACK latency of n+3 the subordinate entity 204 can have a peak throughput of Y bps. Here, for a two-carrier configuration, with a bandwidth of 50 MHz for each component carrier, then the same entries may be provided: for an ACK latency of n+2, the subordinate entity 204 can have a peak throughput of A bps, and for an ACK latency of n+3, the subordinate entity 204 can have a peak throughput of B bps. This information may be tabulated and provided to the scheduling entity 202 in a UE capabilities information message.

In a UE capabilities message, in some examples the above information may be repeated for each carrier aggregation configuration supported. That is, for each of multiple carrier aggregation modes, the UE capabilities information message may include multiple ACK latency values, each with a respective associated threshold (e.g., peak) downlink throughput value. In a further example, this repeated signaling may be limited to those carrier aggregation configurations or modes capable of delivering a minimum desired threshold throughput value.

During scheduling, the eNB or scheduling entity 202 may make the decision to serve the UE or subordinate entity 204 at a throughput that is matched with the expected ACK latency level. In some examples, the eNB may prefer a lower throughput (e.g. FDM among users) with tighter ACK turnaround, to reduce the gap between a packet and its ACK transmission, particularly if the system is highly loaded.

Table 1 below provides one example of a basic UE capabilities information message as it may appear according to some aspects of the disclosure. As described above, this table includes a first sub-table corresponding to a single 160 MHz component carrier, showing threshold downlink throughput values for an n+2 ACK latency and for an n+3 ACK latency. The table further includes a second sub-table corresponding to a second carrier aggregation mode, utilizing two 80 MHz component carriers. Here, threshold downlink throughput values are also shown for an n+2 ACK latency and for an n+3 ACK latency.

TABLE 1

|  | Threshold DL Throughput |
| --- | --- |
| Single CC 160 MHz |  |
| n + 2 ACK latency | X bits/TTI |
| n + 3 ACK latency | Y bits/TTI |
| 2CC: 80 + 80 MHz |  |
| n + 2 ACK latency | A bits/TTI |
| n + 3 ACK latency | B bits/TTI |

This basic eNB-UE coordination signaling as described above may be suitable for supporting some of the above-described algorithms, for example, for momentarily increasing the processing throughput. However, as described above, momentarily increasing the processing throughput may be limited in value, in that it may not help (or be available as an option) if the UE is already operating at its peak capacity. For example, one or more critical processors or processing stages may already operating at their maximum throughput, and a momentary increase may accordingly be unavailable.

To support additional ones of the above-described algorithms, for example, payload tapering, in addition to the basic UE capabilities information signaling described above, enhanced UE capabilities information signaling may be provided in a further aspect of the disclosure. To support the payload tapering feature, the UE transmission of the UE capabilities information may further include, for example, specifications for payload tapering approaches that are supported. With this information, the threshold downlink throughput with n+2 ACK latency (or otherwise, the minimum ACK turnaround latency supported) may be supported.

In some examples, to support payload tapering, the UE capabilities information message may further include information such as a maximum number of code blocks (CBs) supported over each symbol in a TTI, information regarding a reduction of MIMO layers, and/or any suitable information relating to reduction schedule as described above.

For example, suppose that payload tapering is desired to be achieved by reducing the load on demapping circuitry 442 in the subordinate entity 204 (see FIG. 4), e.g., by reducing in the number of MIMO layers (i.e., the rank) during symbol(s) at or near the end of the TTI. Here, the UE may indicate in a reduction schedule that the maximum number of layers the UE wishes to support for symbols 0 to (n−2) may be 4 layers, but near the end of the TTI (i.e., symbols n−1 and n), the maximum number of layers the UE wishes to support may be 2 layers. In another example, the UE may specify a maximum number of CBs per symbol for symbols 0 to (n−2), but near the end of the TTI, the maximum number of CBs per symbol may be a lower maximum.

Of course, the above are merely some examples of a reduction schedule. Within the scope of the present disclosure, a reduction schedule may be configured according to any of the various payload tapering algorithms described above. In any of these examples, such a reduction schedule may be signaled from the subordinate entity 204 to the scheduling entity 202 in the UE capabilities information message, as described above.

In response, the eNB or scheduling entity 202 may elect to utilize payload tapering for a downlink data transmission. Accordingly, the scheduling entity 202 may indicate to the subordinate entity 204 information about its selected payload tapering scheme, e.g., via PDCCH downlink signaling, or other suitable signaling messages. In this way, the UE may determine the algorithm to utilize the signaled payload tapering algorithm.

Table 2 below provides an example of an enhanced UE capabilities information message supporting payload tapering as it may appear according to some aspects of the disclosure.

TABLE 2

|  | Basic | Enhanced w/ Payload Tapering |
|---|---|---|
| Supported? | | |
| n + 2 ACK latency | Yes | Yes |
| n + 3 ACK latency | Yes | No - purpose of payload tapering is to support tighter ACK latency |
| Single CC 160 MHz | | |
| n + 2 ACK latency | 0.5 * X bits/TTI | 0.95 * X bits/TTI |
| n + 3 ACK latency | 0.9 * X bits/TTI | N/A |
| 2CC: 80 + 80 MHz | | |
| n + 2 ACK latency | 0.75 * X bits/TTI | 0.95 * X bits/TTI |
| n + 3 ACK latency | 0.9 * X bits/TTI | N/A |

This example illustrated in Table 2 applies to a TDD system, although those of ordinary skill in the art will recognize that this table may easily be modified to accommodate an FDD or other duplex system. This table includes three sub-tables: a first sub-table showing whether pipeline efficiency coordination is supported, a baseline single-carrier configuration, and a carrier aggregation configuration utilizing two component carriers.

As seen in this table, a left-hand column lists different UE-supported ACK turnaround latency values. In this example appears an n+2 ACK latency and an n+3 ACK latency. With the n+3 ACK latency, an extra symbol may appear in a gap between a data transmission and its corresponding ACK transmission.

To the right of this column is a 'basic' column indicating information relating to modem processing pipeline efficiency coordination when payload tapering is not being used. In the 'basic' column, the threshold downlink throughput that can be achieved in bits per TTI for the associated ACK turnaround latency may be indicated. To the right of the 'basic' column is an 'enhanced' column with a different threshold downlink throughput that may be utilized for that ACK turnaround latency when payload tapering is used. The 'baseline' table is essentially cloned, including rows with the threshold downlink throughput information for the different ACK turnaround latencies with a carrier aggregation configuration.

In this example, it may be assumed that the baseline single-carrier configuration corresponds to a single 160-MHz component carrier that supports 4-layer MIMO using 256 QAM and a given code rate. Although not shown in the illustrated table, in some examples there may further be separate entries for TDD/FDD, normal cyclic prefix or extended cyclic prefix (NCP/ECP), etc.

The two columns on the right provide general specifications of throughput supported by the subordinate entity 204, where a reduced threshold downlink throughput may be provided for different ACK turnaround latency values. In the far-right column, further modified threshold throughput values may be provided for the last symbol(s) at or near the end of a TTI for a payload tapering configuration, as described above.

Further, the subordinate entity 204 may designate a given scheme for payload tapering. For example, this scheme may limit the last symbol(s) at or near the end of the TTI to 2-layer MIMO, and/or may place a limit on the code rate, and/or may place a limit on the maximum number of CBs per symbol. The subordinate entity 204 may also designate the symbol(s) for which above limitation should be applied by the scheduling entity 202 in downlink data transmissions.

In response to the receipt of this table in the UE capabilities information message, the scheduler at the eNB/scheduling entity 202 may rank the table entries from lowest to highest throughput across the basic and enhanced coordination algorithms. For downlink data to-be-scheduled, the scheduling entity may accordingly choose the entry from the ranked list that offers just more throughput than needed. If there is a tie, in some examples, the scheduling entity may give preference to the baseline single-carrier configuration. Here, if higher than the highest throughput is supported, the scheduling entity 202 may select the highest throughput from the table. Selection of the carrier aggregation (CA) configuration may be performed semi-statically or heuristically.

In a further aspect of the disclosure, certain closed-looped eNB-UE coordination may be performed to dynamically update the payload tapering schedule in accordance with the effectiveness of the payload tapering. For example, when utilizing payload tapering, if a UE or subordinate entity 204 runs out of processing time and fails to meet its ACK turnaround time, the UE may begin dropping CBs. In this case, in some aspects of the disclosure, the UE may continuously, periodically, or intermittently transmit feedback to the scheduling entity 202 including a "process overrun status" for its last symbol(s). Here, the payload tapering circuitry 342 at the scheduling entity 202 may accordingly perform a suitable estimation algorithm, and may estimate how much payload tapering it should apply to that UE in accordance with the process overrun status. For example, if a desired ACK turnaround time is not being met by the UE, additional payload tapering (e.g., additional load reduction at one or more of the demapping circuitry 442 or the decoder 443, additional padding, etc.) may be performed in subsequent downlink data transmissions. On the other hand, if the desired ACK turnaround time is being easily met by the UE, reduced payload tapering may be performed in subsequent downlink data transmissions. This update to the payload tapering schedule may be performed dynamically or semi-dynamically in various implementations.

Figure 15:
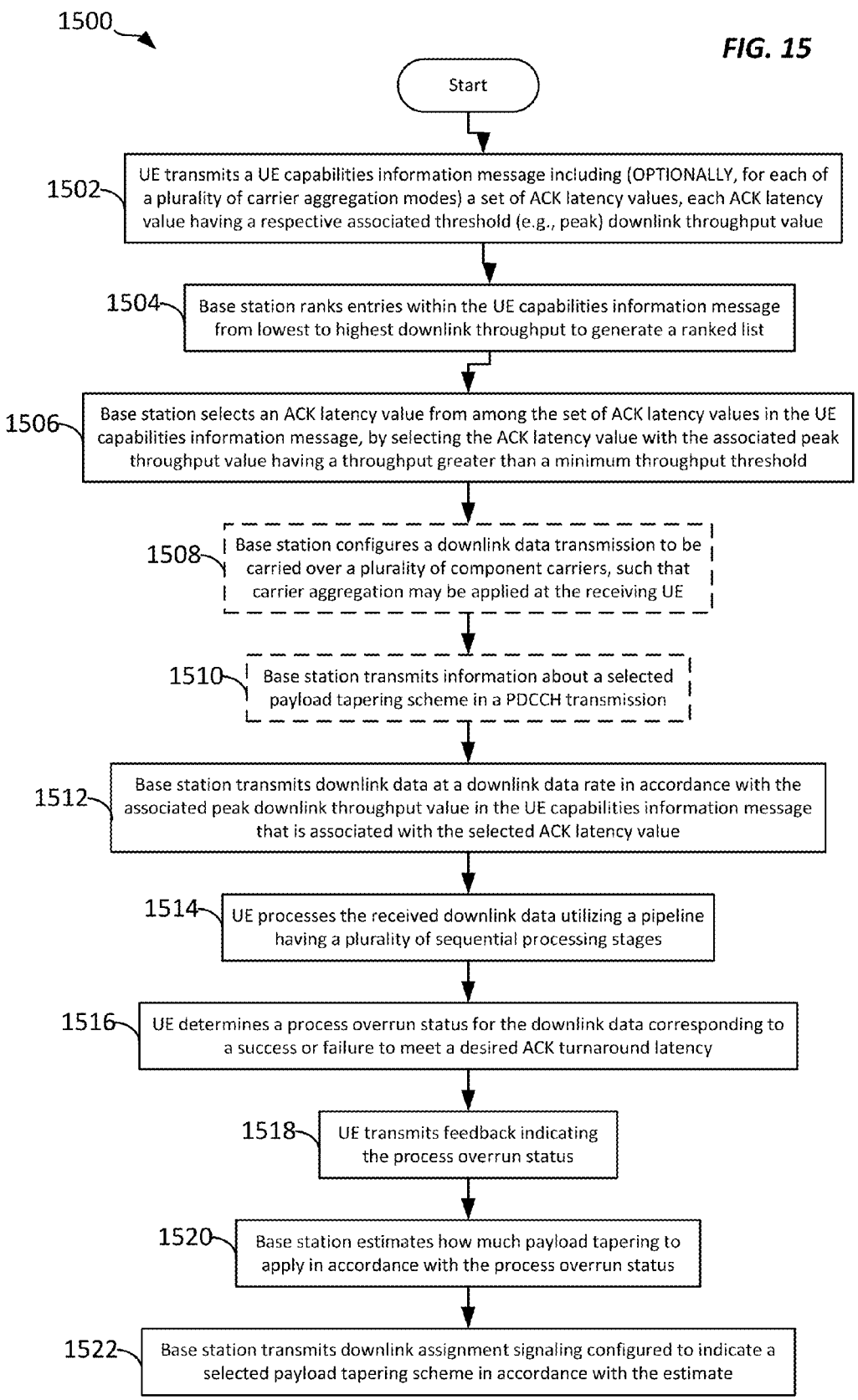
FIG. 15 is a flow chart illustrating an exemplary process for inter-node coordination for managing a modem processing timeline according to some embodiments.

FIG. 15 is a flow chart illustrating an exemplary process 1500 for inter-node coordination for managing a processing pipeline in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the scheduling entity 202 in coordination with the subordinate entity 204. In some examples, the process 1500 may be carried out by any suitable apparatus or means for carrying out the functions or algorithm described below.

At block 1502, the UE or subordinate entity 204 may transmit a UE capabilities information message on an uplink transmission. Here, the UE capabilities information message may include for each of a plurality of carrier aggregation modes, a set (e.g., a plurality) of ACK latency values, each ACK latency value having a respective associated threshold (e.g., peak) downlink throughput value. In some examples, the UE capabilities information message may further include a reduction schedule for configuring payload tapering of the requested downlink transmission.

At block 1504, the base station, eNB, or scheduling entity 202 may rank the entries within the UE capabilities information message from the lowest throughput to the highest downlink throughput, and at block 1506, the scheduling entity 202 may select an ACK latency value from among the set of ACK latency values in the UE capabilities information message, by selecting the ACK latency value with the associated threshold downlink throughput value having a downlink throughput greater than a minimum downlink throughput threshold.

At block 1508, the scheduling entity 202 may configure a downlink data transmission to be carried over a plurality of component carriers, such that carrier aggregation may be applied at the receiving UE or subordinate entity 204. At block 1510, if payload tapering is utilized in the downlink transmission, the scheduling entity 202 may transmit information about the selected payload tapering scheme, e.g., in a PDCCH transmission.

At block 1512, the scheduling entity 202 may transmit downlink data at a downlink data rate in accordance with the associated threshold downlink throughput value in the UE capabilities information message that is associated with the selected ACK latency value. In examples implementing payload tapering, the scheduling entity 202 may taper a payload at one or more symbols at or near an end of a TTI in the downlink data. As described above, several options for how to implement the payload tapering may be utilized, including but not limited to loading the one or more symbols with non-data symbols, reducing a number of MIMO layers for the one or more symbols, limiting a modulation order for the one or more symbols, reducing a coding rate for the one or more symbols, reducing a maximum number of code blocks supported in each symbol, and/or transmitting padding for the one or more symbols. Furthermore, in some examples, the scheduling entity may increase a tone spacing and shorten a symbol duration for symbols in the downlink data transmission, such that pipelining granularity may be reduced at the receiving UE or subordinate entity 204.

At block 1514, the subordinate entity 204 may process the received downlink data utilizing a pipeline having a plurality of sequential processing stages. Here, in some examples the subordinate entity 204 may momentarily increase a processing throughput for one or more of the processing stages of the pipeline.

At block 1516, the subordinate entity 204 may determine a process overrun status for the downlink data corresponding to a success or failure to meet a desired ACK turnaround latency, and at block 1518, the subordinate entity may transmit feedback indicating a process overrun status. In response, at block 1520, the scheduling entity 202 may estimate how much payload tapering to apply in accordance with the process overrun status, and at block 1522, the scheduling entity 202 may transmit downlink assignment signaling configured to indicate a selected payload tapering scheme in accordance with the estimate from block 1520.

Figure 16:
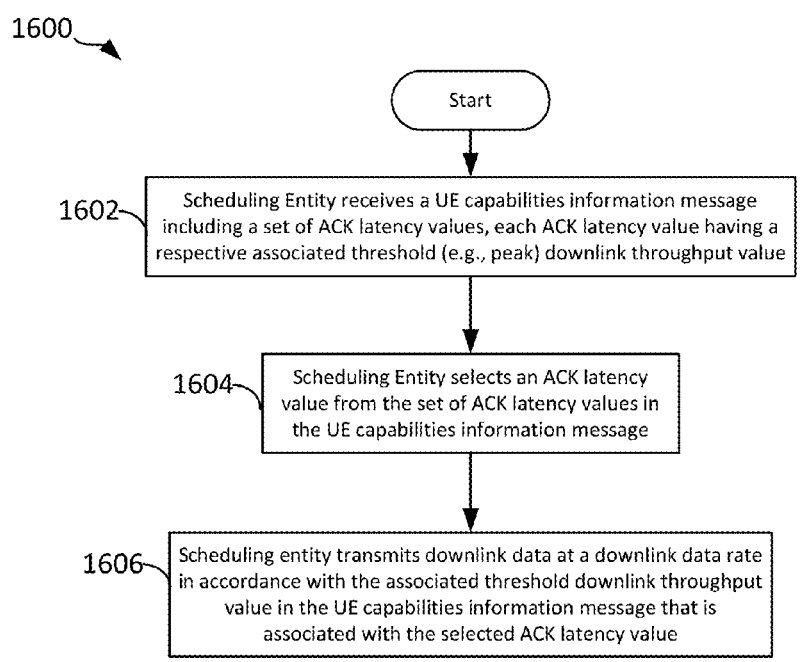
FIG. 16 is a flow chart illustrating an exemplary process for inter-node coordination for managing a modem processing timeline according to some embodiments.

FIG. 16 is a flow chart illustrating an exemplary process 1600 for inter-node coordination for managing a processing pipeline in accordance with some aspects of the present disclosure. Some or all illustrated features may be omitted in a particular implementation within the scope of the present disclosure, and some illustrated features may not be required for implementation of all embodiments. In some examples, the process 1600 may be carried out by the scheduling entity 202. In some examples, the process 1600 may be carried out by any suitable apparatus or means for carrying out the functions or algorithm described below.

At block 1602, a base station or scheduling entity 202 may receive a UE capabilities information message. The UE capabilities information message may include a set of acknowledgment (ACK) latency values, where each ACK latency value may include a respective associated threshold downlink throughput value.

At block 1604, the base station or scheduling entity 202 may select an ACK latency value from the set of ACK latency values in the received UE capabilities information message. Then, at block 1606, the base station or scheduling entity 202 may transmit a downlink data transmission at a downlink data rate corresponding to the associated threshold downlink throughput value in the UE capabilities information message that is associated with the selected ACK latency value.

Figure 17:
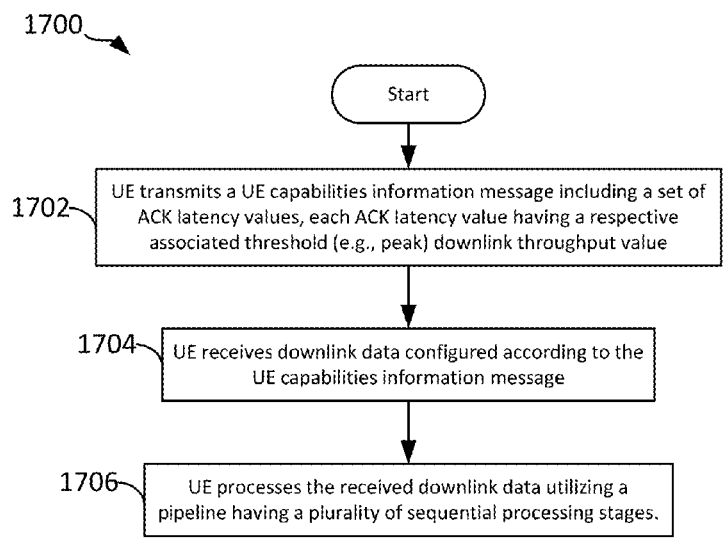
FIG. 17 is a flow chart illustrating an exemplary process for inter-node coordination for managing a modem processing timeline according to some embodiments.

FIG. 17 is a flow chart illustrating an exemplary process 1700 for inter-node coordination for managing a processing pipeline in accordance with further aspects of the present disclosure. Some or all illustrated features may be omitted in a particular implementation within the scope of the present disclosure, and some illustrated features may not be required for implementation of all embodiments. In some examples, the process 1700 may be carried out by the subordinate entity 204. In some examples, the process 1700 may be carried out by any suitable apparatus or means for carrying out the functions or algorithm described below.

At block 1702, a UE or subordinate entity 204 may transmit a UE capabilities information message. The UE capabilities information message may include a set of acknowledgment (ACK) latency values, each ACK latency value having a respective associated threshold (e.g., peak) downlink throughput value.

At block 1704, the UE may receive downlink data configured according to the UE capabilities message. Then, at block 1706, the UE may process the received downlink data utilizing a processing pipeline having a plurality of sequential processing stages, as described above.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein; and one or more elements, components, steps, and/or functions may not be required for implementations of all embodiments. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented unless specifically recited therein.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

The invention claimed is:

1. A scheduling entity configured for wireless communication, comprising:
   a processor;
   a memory communicatively coupled to the processor; and
   a transceiver communicatively coupled to the processor, wherein the processor is configured for:
      utilizing the transceiver to receive a user equipment (UE) capabilities information message comprising a plurality of acknowledgment (ACK) latency values of the UE, each ACK latency value having a respective associated threshold downlink throughput value for the UE;
      selecting an ACK latency value from the set of ACK latency values in the UE capabilities information message; and
      utilizing the transceiver to transmit downlink data at a downlink data rate in accordance with the associated threshold downlink throughput value in the UE capabilities information message that is associated with the selected ACK latency value.

2. The scheduling entity of claim 1, wherein each ACK latency value in the set of ACK latency values has a respective associated threshold downlink throughput value for each of a plurality of carrier aggregation modes.

3. The scheduling entity of claim 1, wherein the processor is further configured for configuring the downlink data to be carried over a plurality of component carriers, such that carrier aggregation may be applied at the UE.

4. The scheduling entity of claim 1, wherein the UE capabilities information message further comprises a reduction schedule for configuring payload tapering of the downlink data.

5. The scheduling entity of claim 1, wherein the processor is further configured for:
   tapering a payload at one or more symbols at or near an end of a transmission time interval (TTI), wherein the tapering comprises one or more of:
   loading the one or more symbols with non-data symbols;
   reducing a number of MIMO layers for the one or more symbols;
   limiting a modulation order for the one or more symbols;
   reducing a coding rate for the one or more symbols;
   reducing a maximum number of code blocks supported in each symbol; or
   transmitting padding for the one or more symbols.

6. The scheduling entity of claim 1, wherein the processor is further configured for:
   ranking entries within the UE capabilities information message from lowest to highest downlink throughput to generate a ranked list; and
   selecting an entry from the ranked list that offers a throughput greater than a minimum downlink throughput threshold.

7. The scheduling entity of claim 1, wherein the processor is further configured for:
   increasing a tone spacing and shortening a symbol duration for symbols in the downlink data.

8. The scheduling entity of claim 1, wherein the respective associated threshold downlink throughput value for the UE is based on the UE capability.

9. The scheduling entity of claim 1, wherein the ACK latency value only supports a range of downlink throughput values at or below the associated threshold downlink throughput value.

10. The scheduling entity of claim 5, wherein the processor is further configured for:

receiving feedback from the UE, comprising a process overrun status for the downlink data, configured to indicate a success or failure of the UE to meet a desired ACK turnaround latency;
estimating how much payload tapering to apply in accordance with the process overrun status; and
transmitting downlink assignment signaling configured to indicate a selected payload tapering scheme in accordance with the estimate.

11. A user equipment (UE) configured for wireless communication, comprising:
a processor comprising a pipeline having a plurality of sequential processing stages;
a memory communicatively coupled to the processor; and
a transceiver communicatively coupled to the processor, wherein the processor is configured for:
utilizing the transceiver to transmit a UE capabilities information message comprising a plurality of ACK latency values of the UE, each ACK latency value having a respective associated threshold downlink throughput value for the UE;
utilizing the transceiver to receive, from a scheduling entity, downlink data configured according to the UE capabilities information message; and
processing the received downlink data utilizing the pipeline having the plurality of sequential processing stages.

12. The UE of claim 11, wherein each ACK latency value in the set of ACK latency values has a respective associated threshold downlink throughput value for each of a plurality of carrier aggregation modes.

13. The UE of claim 11, wherein the UE capabilities information message further comprises a reduction schedule for configuring payload tapering of the downlink data transmission.

14. The UE of claim 11, wherein the processor is further configured for:
determining a process overrun status for the downlink data corresponding to a success or failure to meet a desired ACK turnaround latency; and
transmitting feedback to the scheduling entity, indicating the process overrun status.

15. The UE of claim 11, wherein the processor is further configured for:
momentarily increasing a processing throughput for one or more of the sequential processing stages of the pipeline.

16. A method of wireless communication operable at a scheduling entity, the method comprising:
receiving a user equipment (UE) capabilities information message comprising a plurality of ACK latency values of the UE, each ACK latency value having a respective associated threshold downlink throughput value for the UE;
selecting an ACK latency value from among the set of ACK latency values in the UE capabilities information message; and
transmitting downlink data at a downlink data rate in accordance with the associated threshold downlink throughput value in the UE capabilities information message that is associated with the selected ACK latency value.

17. The method of claim 16, wherein each ACK latency value in the set of ACK latency values has a respective associated threshold downlink throughput value for each of a plurality of carrier aggregation modes.

18. The method of claim 16, further comprising configuring the downlink data to be carried over a plurality of component carriers, such that carrier aggregation may be applied at the UE.

19. The method of claim 16, wherein the UE capabilities information message further comprises a reduction schedule for configuring payload tapering of the downlink data.

20. The method of claim 16, further comprising:
tapering a payload at one or more symbols at or near an end of a transmission time interval (TTI), wherein the tapering comprises one or more of:
loading the one or more symbols with non-data symbols;
reducing a number of MIMO layers for the one or more symbols;
limiting a modulation order for the one or more symbols;
reducing a coding rate for the one or more symbols;
reducing a maximum number of code blocks supported in each symbol; or
transmitting padding for the one or more symbols.

21. The method of claim 16, further comprising:
ranking entries within the UE capabilities information message from lowest to highest downlink throughput to generate a ranked list; and
selecting an entry from the ranked list that offers a throughput greater than a minimum downlink throughput threshold.

22. The method of claim 16, further comprising:
increasing a tone spacing and shortening a symbol duration for symbols in the downlink data.

23. The method of claim 20, further comprising:
receiving feedback from the UE, comprising a process overrun status for the downlink data transmission, configured to indicate a success or failure of the UE to meet a desired ACK turnaround latency;
estimating how much payload tapering to apply in accordance with the process overrun status; and
transmitting downlink assignment signaling configured to indicate a selected payload tapering scheme in accordance with the estimate.

24. A method of wireless communication operable at a user equipment (UE), the method comprising:
transmitting a UE capabilities information message comprising a plurality of ACK latency values of the UE, each ACK latency value having a respective associated threshold downlink throughput value for the UE;
receiving, from the scheduling entity, downlink data configured according to the UE capabilities information message; and
processing the received downlink data utilizing the pipeline having the plurality of sequential processing stages.

25. The method of claim 24, wherein each ACK latency value in the set of ACK latency values has a respective associated threshold downlink throughput value for each of a plurality of carrier aggregation modes.

26. The method of claim 24, wherein the UE capabilities information message further comprises a reduction schedule for configuring payload tapering of the downlink data.

27. The method of claim 24, further comprising:
determining a process overrun status for the downlink data corresponding to a success or failure to meet a desired ACK turnaround latency; and
transmitting feedback to the scheduling entity, indicating the process overrun status.

28. The method of claim 24, further comprising:
   momentarily increasing a processing throughput for one or more of the sequential processing stages of the pipeline.

* * * * *